United States Patent [19]

Sekizawa

[11] Patent Number: 5,072,291

[45] Date of Patent: Dec. 10, 1991

[54] IMAGE INFORMATION SIGNAL PROCESSING APPARATUS FOR IMPROVING REPRODUCED IMAGE QUALITY BY DISCRIMINATING THE TYPE OF INPUT IMAGE AND SELECTING A PARTICULAR PROCESSING IN ACCORDANCE THEREWITH

[75] Inventor: Hidekazu Sekizawa, Yokohama, Japan

[73] Assignee: Kabushiki Kaisha Toshiba, Kawasaki, Japan

[21] Appl. No.: 636,007

[22] Filed: Jan. 3, 1991

Related U.S. Application Data

[63] Continuation-in-part of Ser. No. 560,289, Jul. 27, 1990, abandoned, which is a continuation of Ser. No. 57,745, Jun. 3, 1987, abandoned, which is a continuation of Ser. No. 712,186, Mar. 15, 1985, abandoned.

[30] Foreign Application Priority Data

Mar. 29, 1984 [JP] Japan .................................. 59-59426

[51] Int. Cl.⁵ ............................................. H04N 1/46
[52] U.S. Cl. ..................................... 358/75; 358/462; 358/456; 358/457
[58] Field of Search ................. 358/75, 456, 455, 466, 358/467, 462; 382/52, 54

[56] References Cited

U.S. PATENT DOCUMENTS

| | | | |
|---|---|---|---|
| 4,194,221 | 3/1980 | Stoffel | 358/456 |
| 4,288,821 | 9/1981 | Lavallee et al. | 358/456 |
| 4,403,257 | 9/1983 | Hsieh | 358/460 |
| 4,433,346 | 2/1984 | Stoffel et al. | 358/456 |
| 4,547,811 | 10/1985 | Ochi et al. | 358/455 |
| 4,554,593 | 11/1985 | Fox et al. | 358/462 |
| 4,577,235 | 3/1986 | Kannapell et al. | 358/462 |
| 4,663,662 | 5/1987 | Sekizawa et al. | 358/75 |
| 4,811,239 | 5/1989 | Tsao | 358/456 |
| 4,879,753 | 11/1989 | El-Sherbini | 358/456 |
| 4,926,251 | 5/1990 | Sekizawa et al. | 358/75 |
| 5,014,124 | 5/1991 | Fujisawa | 358/457 |
| 5,016,118 | 5/1991 | Nannichi | 358/462 |

FOREIGN PATENT DOCUMENTS

| | | |
|---|---|---|
| 0041400 | 12/1981 | European Pat. Off. . |
| 0100811 | 2/1984 | European Pat. Off. . |
| 57-125580 | 8/1982 | Japan . |
| 58-3374 | 1/1983 | Japan . |

OTHER PUBLICATIONS

Schindler, H. R., et al., "Optical Scanning of Continuous-Tone and Line Documents with Spatial Frequency Separation for Improved Data Handling and Compaction", *IBM Technical Disclosure Bulletin*, vol. 20, No. 12, May 1978, pp. 5416–5421.

Dashiell, Stephen R., "Digital Halftone Screener and Rescreener", *Xerox Disclosure Journal*, vol. 5, No. 1, Jan./Feb. 1980, p. 117.

*Primary Examiner*—Jin F. Ng
*Assistant Examiner*—Jill Jackson
*Attorney, Agent, or Firm*—Oblon, Spivak, McClelland, Maier & Neustadt

[57] ABSTRACT

In an image display system, a picture quality improving circuit is provided for comparing a distribution, in a pixel array of a specified size, of image characteristic signals derived from image information signals each indicating one pixel of the input image with a previously examined distribution of image characteristic signals corresponding to each type of image, to thereby discriminate the type of input image. Further, a binary encoding/dithering selecting circuit responsive to the decision made on the picture type by the image quality improving circuit is provided to binary encode the image information signal applied to the image information output device on the basis of a fixed threshold value, or to dither the image information signal on the basis of variable threshold values, in accordance with the discriminated type of input image. Image information signals corresponding to a character/line image are binary encoded by the fixed threshold value, and the image information signals corresponding to a halftone image or a continuous-tone picture are dithered.

10 Claims, 11 Drawing Sheets

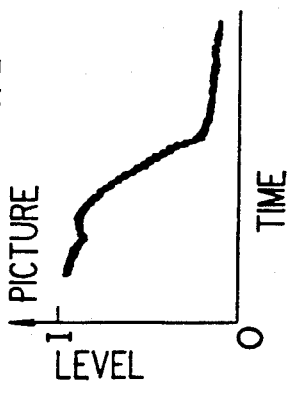
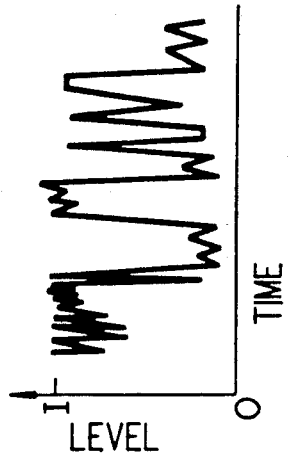
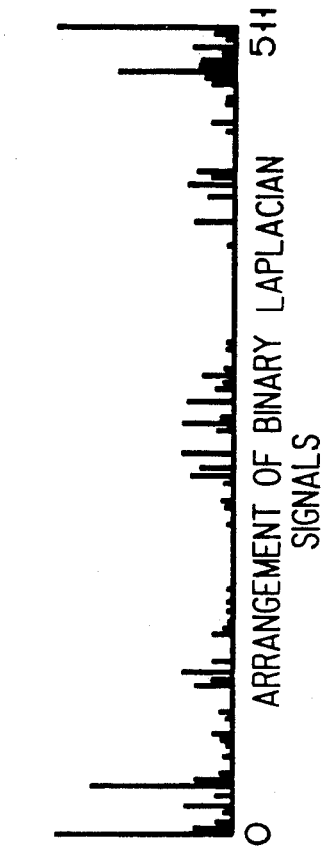
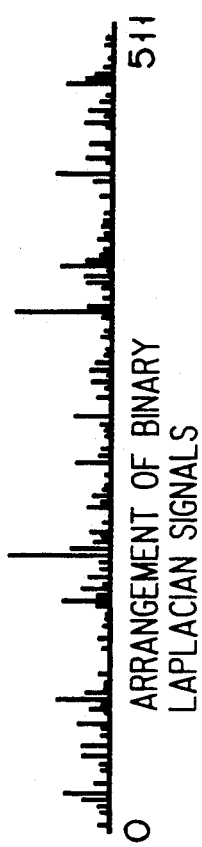

FIG. 7A  FIG. 7B  FIG. 7C
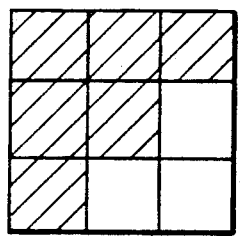 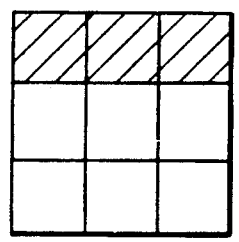 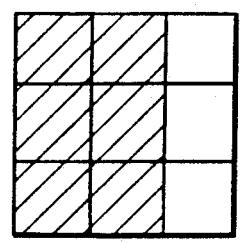
FIG. 8A  FIG. 8B  FIG. 8C
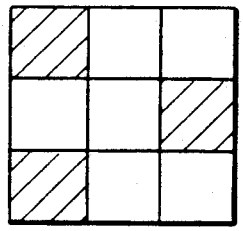 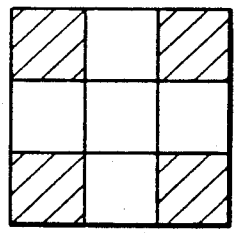 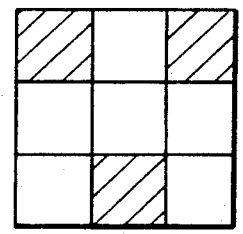
FIG. 9
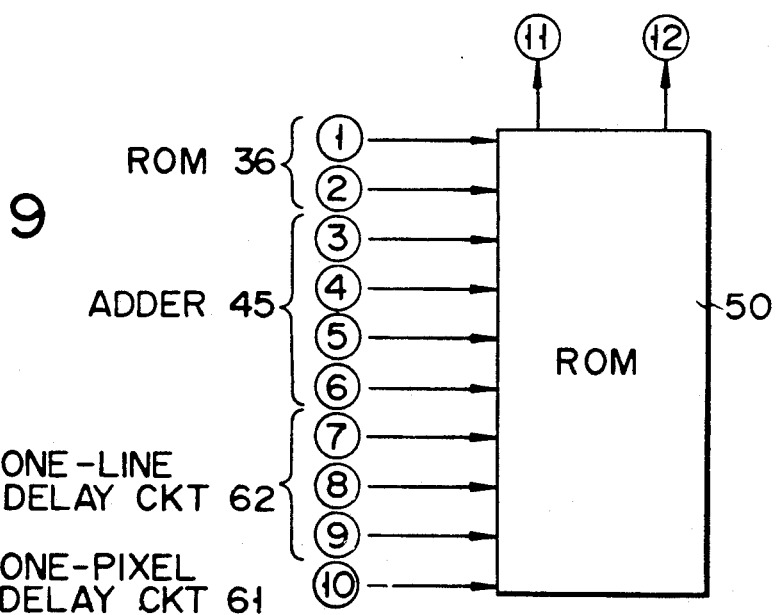
FIG. 10
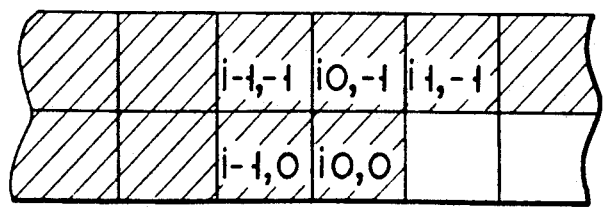

FIG. 11
| i-1,-1 0 | i0,-1 0 | i1,-1 0 |
|---|---|---|
| i-1,0 0 | i0,0 ? | |
FIG. 12
| i-1,-1 0 | i0,-1 1 | i1,-1 0 |
|---|---|---|
| i1,0 0 | i0,0 ? | |
FIG. 13
| i-1,-1 1 | i0,-1 1 | i1,-1 1 |
|---|---|---|
| i-1,0 1 | i0,0 ? | |
FIG. 14
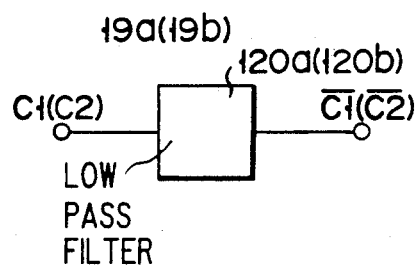
FIG. 15
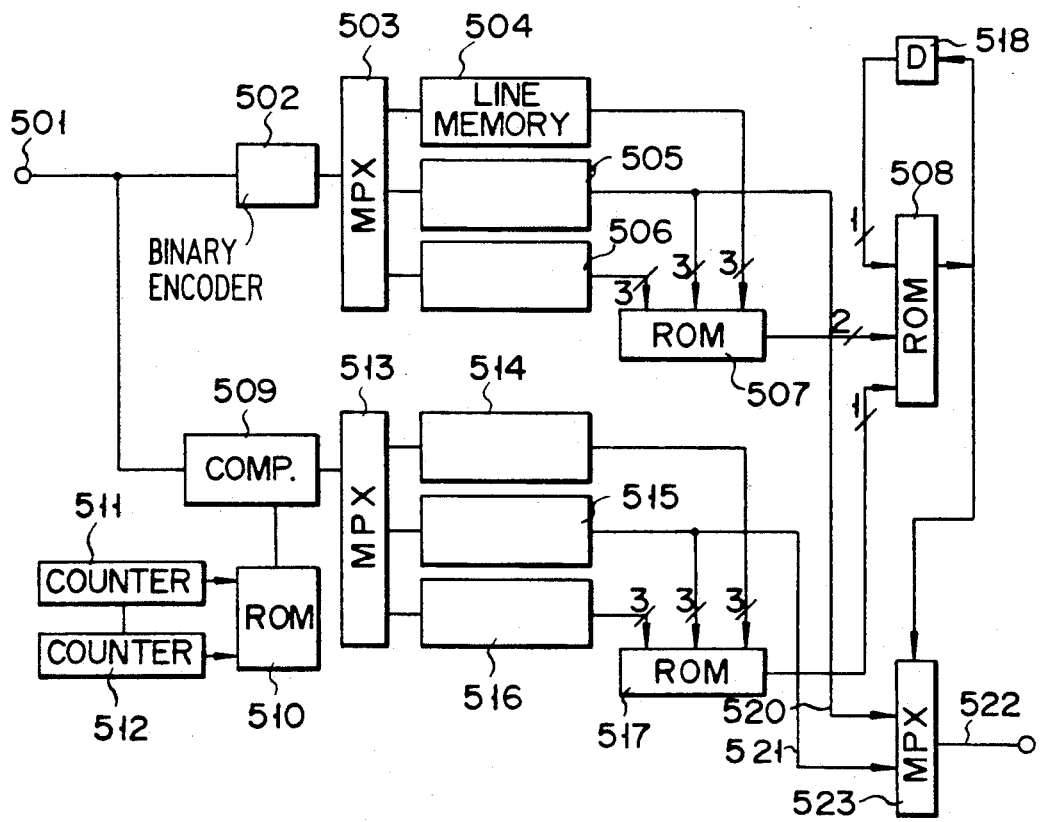

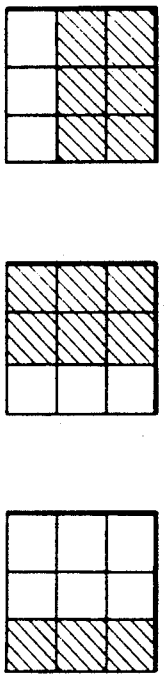
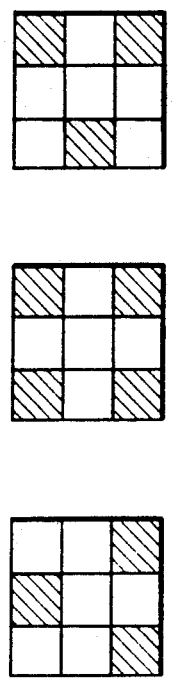
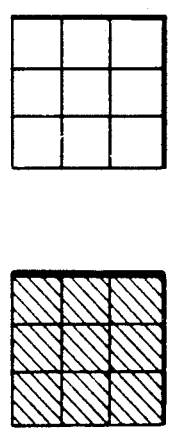
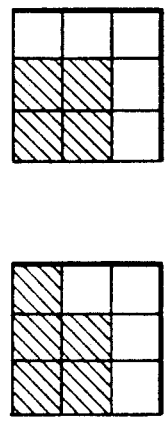
FIG. 16A FIG. 16B FIG. 16C
FIG. 17A FIG. 17B FIG. 17C
FIG. 18A FIG. 18B FIG. 18C FIG. 18D
FIG. 19
FIG. 20A FIG. 20B FIG. 20C FIG. 20D

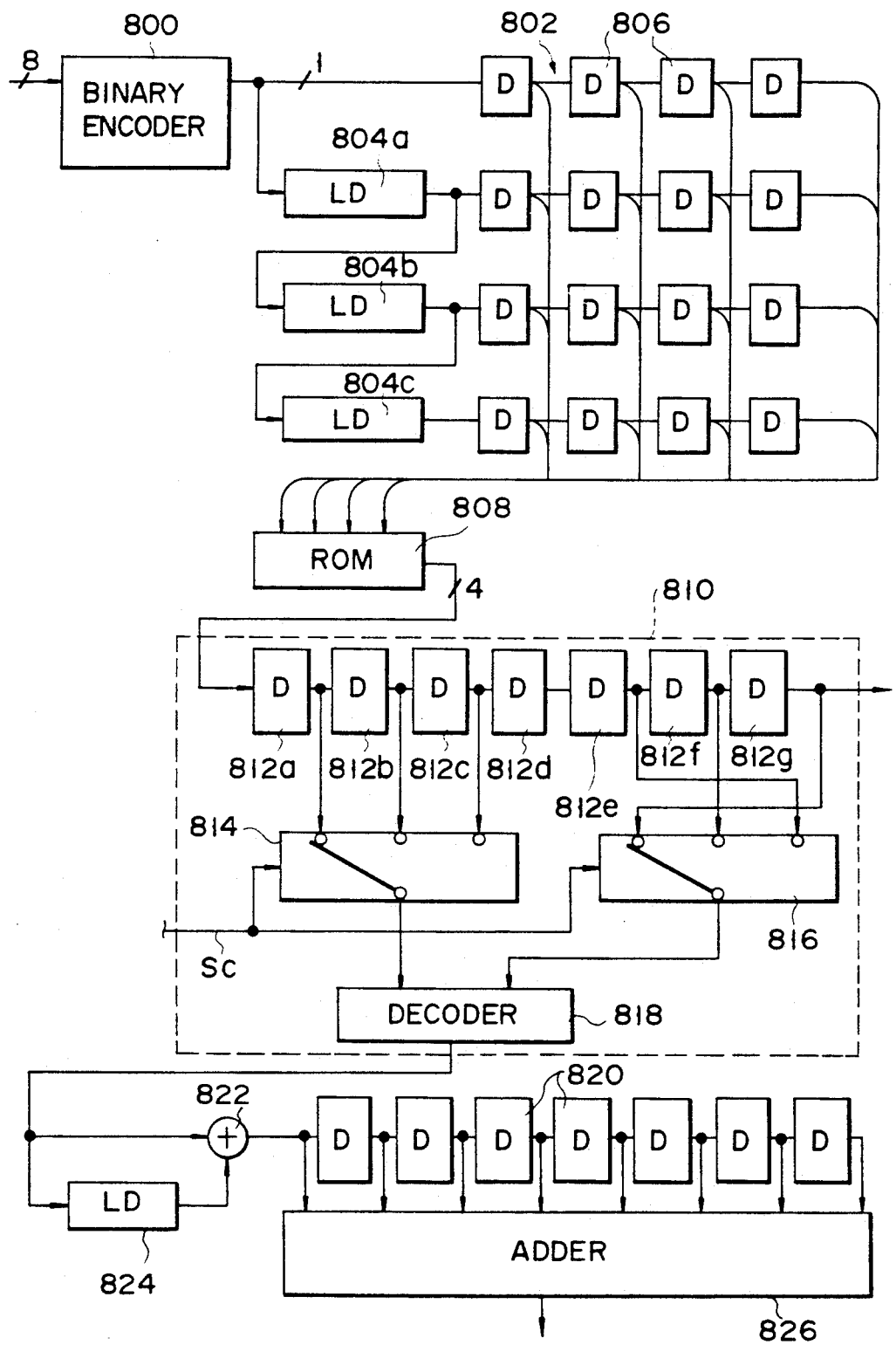
F I G. 23

HEX.
ADD.

HEX.
ADD.

HEX.
ADD.

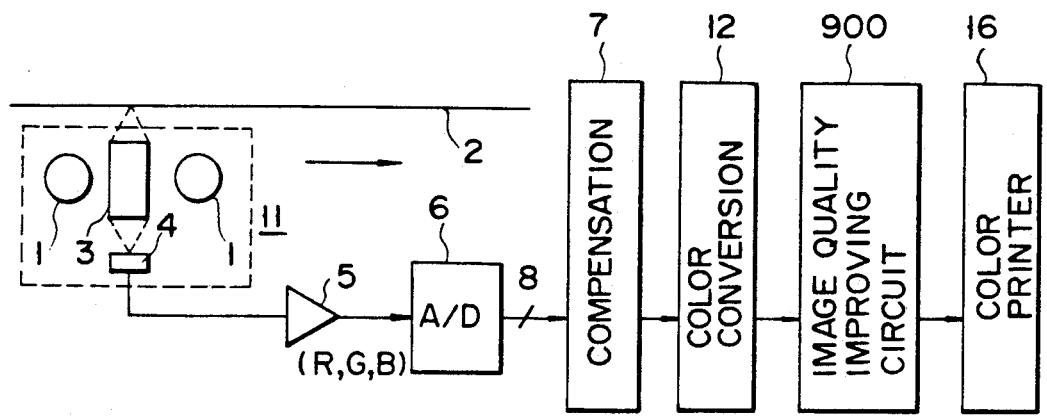
F I G. 28
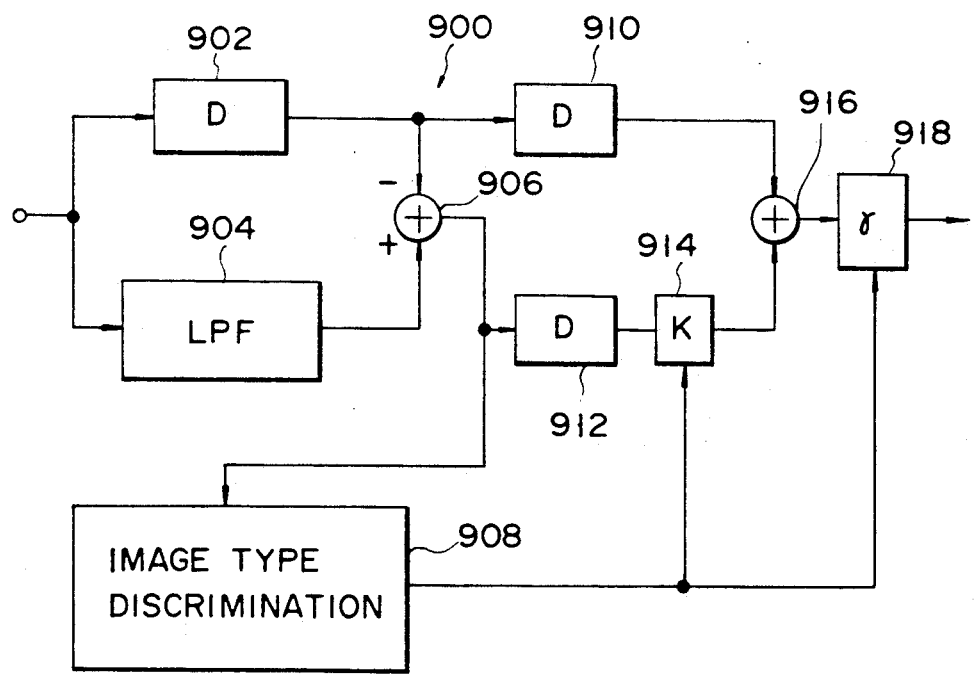
F I G. 29

IMAGE INFORMATION SIGNAL PROCESSING APPARATUS FOR IMPROVING REPRODUCED IMAGE QUALITY BY DISCRIMINATING THE TYPE OF INPUT IMAGE AND SELECTING A PARTICULAR PROCESSING IN ACCORDANCE THEREWITH

This application is a Continuation-In-Part of application Ser. No. 07/560,289, filed on July 27, 1990, now abandoned, which is a Continuation of Ser. No.: 07/057,745 filed June 3, 1987 now abandoned which is a Continuation of Ser. No.: 06/712,186 filed Mar. 15, 1985 now abandoned.

BACKGROUND OF THE INVENTION

The present invention relates to an image information processing apparatus and, more particularly, to an image information signal processing apparatus which is used for displaying, with high quality, different types of picture images read by an image sensor from a document.

Recently, image processing systems have been strongly required to deal with a variety of types of office documents, which include color graphics images in addition to normal character/line-based documents. Such graphics images may contain continuous-tone picture images, such as photographs, and pseudo continuous-tone picture images, such as newspaper dot-photographs that are constructed by arranging various sizes of dots of three primary colors so as to provide a coarse photographic image which tries to "stimulate" the original natural photograph.

The "bi-level" images may be defined as images of two distinct density levels, which typically include the character/line-based document images. The pseudo continuous-tone picture images may also be categorized in the bi-level images. These pseudo continuous-tone picture images are sometimes called "dot-pattern" picture images, "dot photograph" picture images, "half-tone" images, or "digitized" photograph images.

With presently available image output devices such as liquid-crystal display units or thermal printers, bi-level images can be displayed very stably. Where a general image which contains a continuous-tone picture image such as a photograph image is displayed or printed by these output devices, a continuous-tone image display/print scheme using a dithering technique is conventionally used, wherein a threshold value used for bi-level quantization is varied in accordance with a random or pseudo random function during the continuous-tone picture image information is being quantized into bi-level information.

With such a technique, however, when an image is displayed or printed with a number of gradation, not only does the resolution decrease but irregular noise is liable to be produced. This results in the image quality of an input image containing various types of image components being degraded.

An apparatus is known, which is arranged to input an image using a color image sensor equipped with spatially-divided color filters and output an output signal from the color image sensor to a color printer to reproduce the image. When an input document image containing a color continuous-tone picture image is copied by such an apparatus, dots forming the continuous-tone picture image are reproduced with increased noises, which results in that the colors in the printed document cannot be reproduced precisely.

An improved image information processing system has been disclosed in a copending U.S. patent application Ser. No. 556,323 filed Nov. 30, 1983 (U.S. Pat. No. 4,663,662 issued May 5, 1987); entitled "Picture Signal Processing System Suitable For Displaying Continuous Tone Pictures" and assigned to the same assignee as this patent application. According to one of the methods which are disclosed in this application, the local density variation of an input image is detected. If the density variation is greater than a predetermined specific value, an image information processing circuit quantizes an input image signal into a bi-level image signal on the basis of a fixed threshold value. On the other hand, if the local density variation is smaller than the specific value, the circuit dithers the input image signal.

According to the other method of the patent application, a brightness signal and color information signals are averaged in order to display a color pseudo continuous-tone picture image being constituted by various sizes of dots in three primary colors. By averaging the color information signals, dot-noises can be eliminated. The local density variation of the input image is detected on the basis of the brightness signal that has the dot-noises eliminated therefrom. If this density variation is greater than a preselected specific value, the color information signals are subjected to bi-level quantization using a fixed threshold value. If the density variation is smaller than the specific value, the color information signals are subjected to the dither-processing.

Unfortunately, both of the above methods fail to provide successful reproduction of various types of image images, since a high grade of technical difficulty has been laid in precise detection of pseudo continuous-tone picture regions from within the input image, as well as in selection of the most suitable type of image processing for the detected image regions.

SUMMARY OF THE INVENTION

An object of the present invention is to provide an improved image information signal processing apparatus for use in displaying different types of document images.

Another object of the present invention is to provide an improved image information signal processing apparatus for processing in a different manner according to different types of document images including a character/line-based image, continuous-tone picture images, such as photographs, and pseudo continuous-tone picture images known as "dot photograph" image to properly display these image components.

The image information signal processing apparatus of the present invention is used in an image display system including an image information input means for obtaining an image information signal including an input image by optically scanning the input image, and image information output means responsive to the image information signal to reproduce an output image corresponding to the input image. To enable the image information output means to pleasantly reproduce the output image, the image information signal processing apparatus comprises: image-type discriminating means for discriminating the type of the input image on the basis of a distribution, within a pixel array of a specified size, of image characteristic signals derived from image information signals each representing one pixel of the input image, wherein the image characteristic signals are each a binary Laplacian signal of an image information signal corresponding to one pixel of the input image; and means responsive to the image-type discriminating means to select one of processing for binary encoding the image information signal in accordance with the type of input image, the processed image information signal being applied to the image information output means.

Other and further objects of this invention will become obvious upon an understanding of the illustrative embodiments to be described or will be indicated in the appended claims, and various advantages not referred to herein will occur to one skilled in the art upon employment of the invention in practice. has been decided by the picture type discriminating means to be the third type i.e., continuous-tone picture.

BRIEF DESCRIPTION OF THE DRAWINGS

FIG. 4 is a view for explaining a pixel array which is used to decide the type of a image;

FIGS. 5A, 5B and 5C show image information signals which correspond to a halftone, character image and continuous-tone image, respectively;

FIGS. 6A and 6B show frequencies of occurrence of bi-level patterns of Laplacian signals for a character image and halftone images such as a dot photograph image, respectively;

FIGS. 7A, 7B and 7C show bi-level patterns of Laplacian signals for character images, which occur with high frequencies;

FIGS. 8A, 8B and 8C show bi-level patterns of Laplacian signals for halftone images, which occur with high frequencies;

FIG. 9 is a view for explaining a decision ROM shown in FIG. 3;

FIG. 10 shows a geometric arrangement of pixels for explaining decision operations performed in the decision ROM;

FIGS. 11 to 13 show various bi-level patterns of image signals, adapted for explaining decision codes stored in the decision ROM;

FIG. 14 shows a image quality improving circuit for a color difference signal of FIG. 2;

FIG. 15 shows a second embodiment of the present invention;

FIGS. 16A to 16C, 17A to 17C, 18A to 18D, 19, and 20A to 20D are views for explaining a image-type deciding operation in the second embodiment of the present invention;

FIG. 23 shows an image type discriminator which is preferably used in the embodiments of the present invention;

FIG. 28 shows a fourth embodiment of the present invention; and

FIG. 29 shows the internal circuit arrangement of an image quality improving circuit provided in the embodiment shown in FIG. 28.

DETAILED DESCRIPTION OF THE PREFERRED EMBODIMENTS

Figure 1:
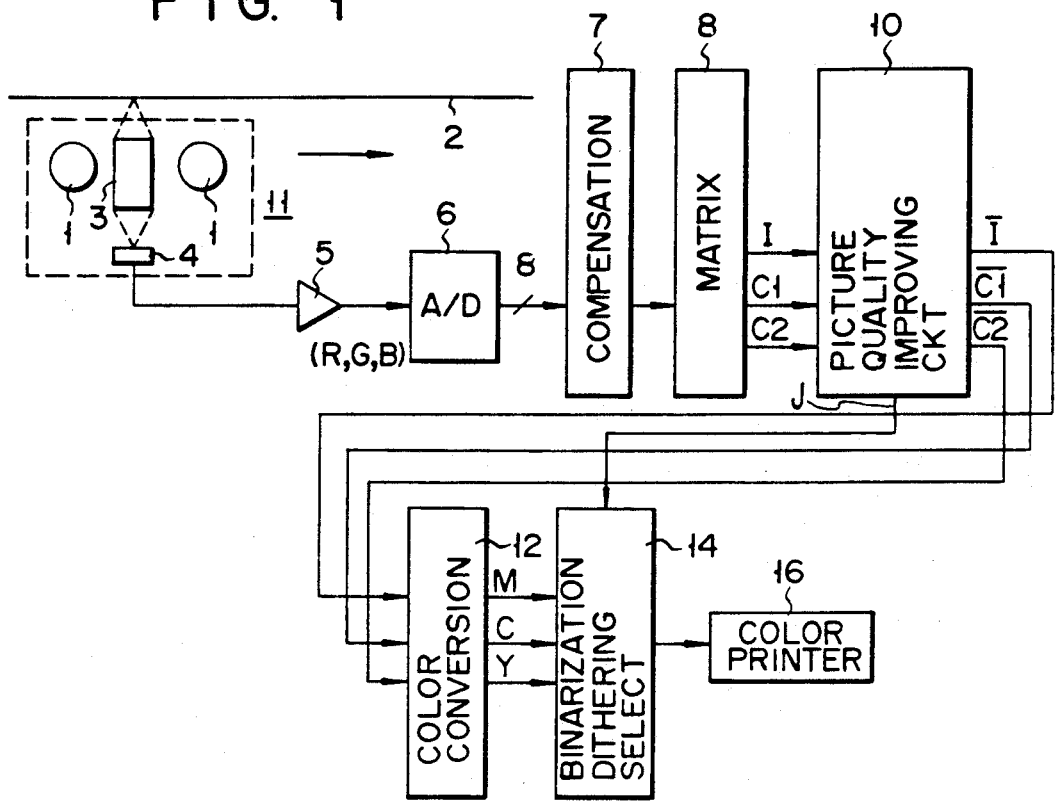
FIG. 1 shows a construction of a color copier which uses a image information processing system of the present invention.

A image information processing apparatus according to an embodiment of the present invention, as shown in FIG. 1, is arranged to suitably process a image information signal to be applied to a image reproduction device by discriminating the characteristic of picture within a local area of a document, in accordance with distribution of rates of variation of the image information signal, corresponding to that local area of the document, read by means of an image sensor. The image information processing apparatus of this embodiment uses a scanning-type proximity sensor as its image input section, and a thermal printer as its image-displaying output section.

Referring now to FIG. 1, a proximity sensor 11 reads an input document 2 carrying a color image thereon, while scanning the document 2 in a direction indicated by an arrow, to produce a image information signal. In the proximity sensor 11, a linear light source 1 irradiates the document 2 and light reflected therefrom is focused on a linear CCD image sensor 4 having CCD chips through a self-focusing rod-lens array 3 which is known under the trade name of "SELFOC". On each sensor element of the image sensor 4 one of color filters for red (R), green (G) and blue (B) components is provided whereby electric signals of R, G and B components for one pixel are obtained. The image information signal contains signals indicating the R, G and B components for each pixel, which are serially read out from the image sensor 4 for each pixel. In this embodiment, one pixel has a length of 84 μm and, within this one pixel, three sensor elements are contained.

The image information signal which has been read out from the image sensor 4 is amplified in an amplifier 5 and then is converted, by an analog-to-digital (A/D) converter 6, into a digital signal of 8 bits. This digital signal is applied to a normalizing circuit 7, which is intended to compensate for variation in sensitivity of the CCD sensor elements of the image sensor 4 and variation in optical characteristics of the color filters, eliminate fixed noise in the CCD, and compensate for variation in the amount of light emanated from the light source and unwanted distribution of the amount of light.

The signal thus normalized is applied to a matrix circuit 8 to be converted from R, G and B signals into a brightness signal I and color difference signals C1 and C2. These signals are applied to a image quality improving circuit 10 as described later which constitutes a main part of the image information processing apparatus. The picture quality improving circuit 10 is arranged to decide the type of the input image and properly processes the brightness signal I and color difference signals C1 and C2 in accordance with the input document. After having been processed in this way, the brightness signal I and color difference signals C1 and C2 are applied to a color conversion circuit 12. The signal system prior to the color conversion circuit 12 handles the additive primaries of R, G and B. The color conversion circuit 12 converts these additive primary signals into subtractive primary signals of magenta (M), cyan (C) and yellow (Y) suitable for the subsequent print in a color printer 16.

The M, C, Y color signals which have been output from the color conversion circuit 12 are applied to a binarization/dithering selecting circuit 14, in which they are binarized or dithered in accordance with a decision made by the image quality improving circuit 10 on the input image (a continuous-tone image such as a photograph, a character/line-based image such as a character document image, or a halftone image such as a pseudo-photographic image called the "dot photograph" image). Thereafter, they are applied to the color printer 16, which reproduces a pleasant color output image corresponding to the color input image by virtue of the image quality improving circuit 10 and the binary encoding/dithering selecting circuit 14.

Figure 2:
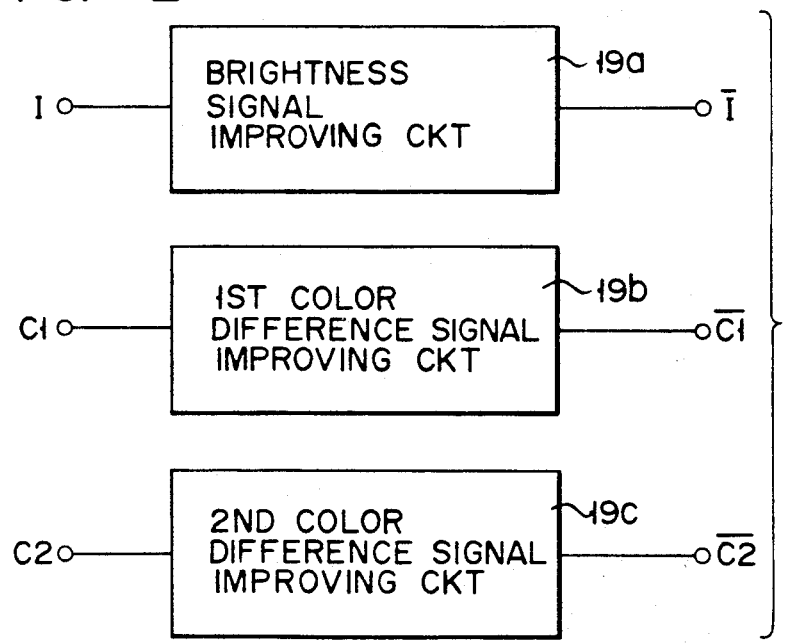
FIG. 2 schematically shows an arrangement of a image quality improving circuitry of FIG. 1.

The image quality improving circuit 10 will now be described in detail. It includes, as shown in FIG. 2, an image quality improving circuit 19a for processing the brightness signal I, and image quality improving circuits 19b and 19c for processing the first and second color difference signals C1 and C2, respectively. The brightness signal and first and second color difference signals which have respectively been processed by those image quality improving circuits are denoted by $\overline{I}$, $\overline{C1}$ and $\overline{C2}$, respectively.

Figure 3:
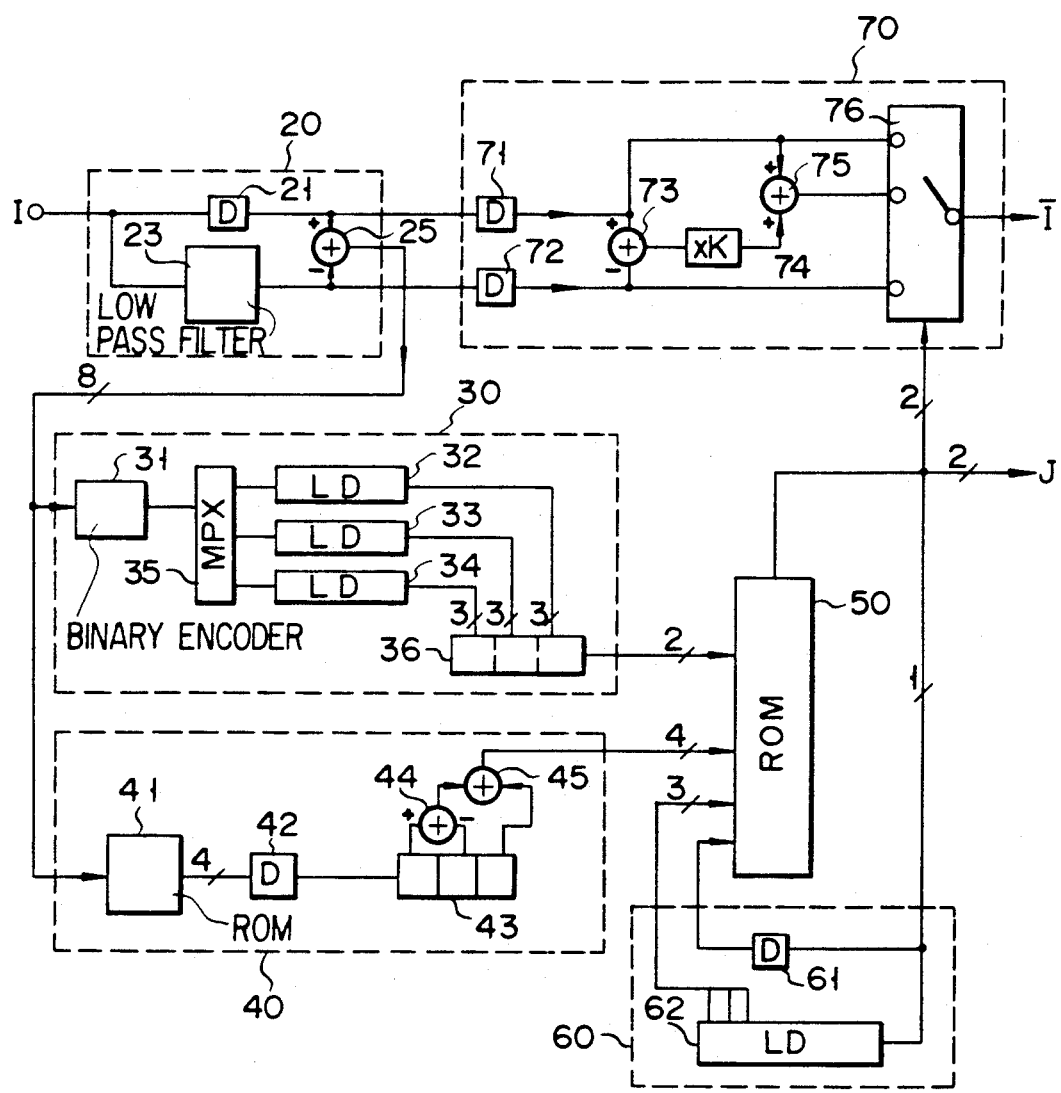
FIG. 3 shows in detail an arrangement of the quality improving circuit of FIG. 2 adapted for a brightness signal.

The brightness-signal image quality improving circuit 19a is shown in FIG. 3. This circuit includes a Laplacian calculating circuit (hereinafter, referred to as "a first circuit") 20, which receives the brightness signal I and calculates its Laplacian with respect to each pixel to produce a Laplacian signal. The Laplacian signal output from the first circuit 20 is applied to a second circuit 30. In this second circuit 30, the Laplacian signal is binary encoded on the basis of a fixed threshold value. Further, in this circuit 30, a pattern of the binary Laplacian signals corresponding to a pixel array of a specified size is compared with predetermined patterns of binary Laplacian signals in a pixel array of the same size. These patterns are previously prepared in the circuit 30 in accordance with the characteristics of various images. The result of comparison is represented in the form of a two-bit configuration. The type of input image is roughly decided by way of this pattern comparison.

The Laplacian signal from the first circuit 20 is also applied to a third circuit 40, which codes an absolute value of the Laplacian signal into a four-bit signal and adds together these coded signals corresponding to a specified number of pixels. The third circuit 40 is intended to examine the significance of the rough decision made by the second circuit 30 in accordance with the magnitude of the Laplacian signal. Therefore, for example, even when the second circuit 30 decides an input document by noise (in this case, the Laplacian signal is relatively small) resulting from stains on the input document, the third circuit 40 can inform the image information processing circuit of the fact that the decision made by the second circuit 30 is based on noise. The output of the third circuit 40 consists of upper four bits of the result of addition.

The outputs of the second and third circuits 30 and 40 are coupled to a fourth circuit 50 which is arranged to integrally decide the type of the input picture. The fourth circuit 50 decides whether the input image is a continuous tone picture, a line image or a halftone image. In order that the circuit 50 may precisely decide a portion of the input document, the result of a preceding decision on another portion of the input document near that portion being decided is fed from a fifth circuit 60 back to the fourth circuit 50. That is, output signals of the second, third and fifth circuits are utilized as image-type decision input signals of the fourth circuit 50. The output signal J of the image-type decision circuit 50 is composed of two bits, the most significant bit of which is applied to the fifth circuit 60. The output signal of the fifth circuit 60 is composed of four bits.

The two-bit output signal J of the image-type decision circuit 50 is applied to a sixth circuit 70 for processing the picture information signal. The image information signal processing circuit 70 receives the brightness signal I to compensate for its high frequency components and average the brightness signal I with respect to a specified number of pixels. Further, the circuit 70 is responsive to the output signal J of the image-type decision circuit 50 to selectively output the high-frequency compensated signal, the averaged signal, or the brightness signal.

In more detail, the Laplacian calculating circuit 20 includes a delay circuit 21 for delaying the input brightness signal I, a low-pass filter (LPF) 23 for passing only low-frequency components of the input brightness signal I, and a subtractor 25 for calculating the difference (Laplacian) between the output signals of the delay circuit 21 and LPF 23. The calculation of Laplacian in accordance with this embodiment corresponds to a process of extracting the high-frequency components from the input signal. It is well known that both of them are qualitatively in coincidence with each other. LPF 23 may actually be arranged to average the picture information signal with respect to a specified number of pixels, e.g., $3 \times 3$ pixels. Constructing LPF 23 in a digital manner is easy. The output signal of the subtractor 25 is applied, as a Laplacian signal, to the second and third circuits 30 and 40.

The algorithm of the Laplacian operation used in this embodiment is such that, as shown in FIG. 4, the difference between the value of a center pixel i22 in the array of $3 \times 3$ pixels and a mean value of pixels ilm (l, m = 1, 2, and 3) including i22 is calculated to obtain the Laplacian of the pixel i22. More specifically, the LPF 23 may comprise an adder circuit for adding together values of corresponding consecutive three pixels ilm on three consecutive scanning lines, and a multiplier circuit (which can be inexpensively constructed using ROM) for reducing an output value of the adder circuit to 1/9. The subtractor 25 calculates the difference between the value of the pixel i22 and a mean value of the $3 \times 3$ pixels ilm to thereby obtain a Laplacian of the pixel i22. In this way, the Laplacian of each pixel is obtained. The Laplacian signal is composed of 8 bits including one sign bit.

The eight-bit Laplacian signal from the first circuit 20 is binary encoded, in the second circuit 30, into "1" or "0" on the basis of a fixed threshold value by a binary encoder 31, which can be constructed of ROM. The binary Laplacian signal from the binary encoder 31, which corresponds to each pixel, is sequentially stored, for each scanning line, in line memories 32, 33, and 34 through a multiplexer 35. Three bits are read out from each of the line memories 32, 33 and 34 and a resultant nine-bit signal is applied to a ROM 36 as an address signal. The ROM 36 previously stores code information, which identifies the types of input images, resulting from distributions of binary Laplacian signals in the 3×3 pixel array which are examined beforehand with respect to continuous tone images, line images and halftone images. For this reason, the ROM 36 is accessed by an address signal from the line memories 32, 33 and 34, which indicates the distribution of binary Laplacian signals, to thereby provide a two-bit code information signal indicating the type of corresponding image. As stated before, the object of second circuit 30 resides in the rough decision of the type of image or the document.

The consideration on which the image information processing of the present invention is based will now be described.

FIG. 5A shows a brightness signal which is obtained by one-dimensional scanning of a halftone image by the proximity sensor 11 while, on the other hand, FIG. 5B shows a brightness signal which is obtained by one-dimensional scanning of a character picture by the sensor 11. As seen in FIGS. 5A and 5B, in the halftone image and character picture, great local variation occurs in the amplitude of the brightness signal which indicates the density of the picture. For this reason, it is difficult to discriminate between the dot and character images on the basis of such local variation in amplitude of the Laplacian signals. FIG. 5C shows a brightness signal which is obtained by one-dimensional scanning of a continuous-tone image such as a photograph. In this case, as can be seen, the Laplacian signal is small. Therefore, such a continuous-tone image can be sufficiently discriminated from the halftone image and character picture on the basis of the magnitude of the Laplacian signals. In order to discriminate between the halftone image and the character image, it is sufficient to examine the distribution of binary Laplacian signals corresponding to pixels in a specified pixel array.

Examination was made of the distribution of binary Laplacian signals with respect to each of a character picture and halftone image, the results were obtained as shown in FIGS. 6A and 6B. In the Figures, the abscissa represents the arrangement of binary Laplacian signals in the array of 3×3 pixels and the ordinate represents the frequency with which the arrangement of binary Laplacian signals occurs. The arrangement of binary Laplacian signals consists of a 9-bit data whose MSB and LSB correspond to i11 and i33 in the 3×3 pixel array shown in FIG. 4, respectively. For example, where only the binary Laplacian signal corresponding to the pixel i11 is 1, the 9-bit data is given by "100000000". At the left end of the abscissa, all binary Laplacian signals for the 3×3 pixel array are 0 and, at the right end thereof, all binary Laplacian signals are 1. As seen from the result shown in FIG. 6A, in case of character images, such patterns of binary Laplacian signals as shown in FIGS. 7A, 7B and 7C appear with a higher frequency. In this case, there is a tendency that not only white pixels but also black pixels are arranged side by side to some extent. This tendency coincides with the qualitative tendency of a character pattern.

On the other hand, the result shown in FIG. 6B is obtained with respect to halftone images. As seen, such patterns of binary Laplacian signals as shown in FIGS. 8A, 8B and 8C appear with a higher frequency. This indicates the qualitative tendency of halftone images that neither white pixels nor black pixels are continuously arranged but they have a periodic pattern. In FIGS. 7 and 8, portions where oblique lines are drawn each represent the binary Laplacian signal of "1" and portions where no lines are drawn each represent the binary Laplacian signal of "0".

Accordingly, the discrimination of the type of input images becomes possible by examining the magnitude of Laplacian signals and the distribution of binary Laplacian signals. For this reason, in the second circuit 30, the Laplacian signals are binary encoded and the address signal indicating the distribution of binary Laplacian signals in the 3×3 pixel array is applied to the ROM 36. In accordance with data shown in FIGS. 6A and 6B, ROM 36 stores code information adapted for discriminating the type of input images, in its storage location accessed by an address signal indicating an arrangement of binary Laplacian signals. In order to discriminate three types of images, i.e., halftone image, line image, and continuous tone image, ROM 36 stores code information composed of two bits (for example, 00, 01, or 11). For simplification, only the sign bit of Laplacian signal may be handled in place of binary encoding the Laplacian signal.

The Laplacian signal is also applied to the third circuit 40, in which the Laplacian signal is converted into an absolute value and also is subjected to non-linear conversion. ROM 41 converts the Laplacian signal, in a non-linear manner, into a 4-bit signal for the convenience of the subsequent additive operation, whereby Laplacian signals having opposite signs and an equal magnitude are converted into the same digital information of 4 bits. The 4-bit information from the ROM 41 is applied to a latch circuit 43 through a delay circuit 42 arranged to provide a time delay corresponding to the time delay caused by the second circuit 30. The latch circuit 43 stores information signals corresponding to three pixels. The three-pixel information signals are added together by adders 44 and 45. The most significant 4 bits of the 5-bit sum is applied to the image-type decision circuit 50. The third circuit 40 examines the magnitude of Laplacian signals to cooperate the fourth circuit 50 for deciding the type of input images. Through a simple image-type decision by the second circuit 30 based on the comparison between distribution patterns of binary Laplacian signals, stains or the like of the input document can be determined to be one of halftone image, continuous tone image, and line image. In case of stains, the Laplacian signals are relatively small. For this reason, through examining the magnitude of the Laplacian signals, the image-type decision circuit 50 is prevented from making an erroneous decision such as stains being one of the above-mentioned three types of images, so a more precise decision of the picture type becomes possible.

The image-type decision circuit 50 is formed of ROM. Following address input signals are applied to the ROM as shown in FIG. 9. That is, a 2-bit signal from the ROM 36 are applied to inputs ①  and ②  corresponding to two most significant bits, a 4-bit signal from the third circuit 40 are applied to inputs ③ to ⑥, a 3-bit signal from a one-line delay circuit 62 as later described are applied to inputs ⑦ to ⑨, and a 1-bit signal from a one-pixel delay circuit 61 is applied to input ⑩ corresponding to the least significant bit. As later described, the ROM 50 evaluates a minute picture area (4×5 pixels) on the basis of address signals applied thereto.

The ROM 50 has two-bit outputs ⑪ and ⑫. That is, the output signal J of the ROM 50 is 11, 10, 01 or 00. The meanings of these output signals are as shown in Table 1 below.

TABLE 1

| Outputs of ROM ⑪ | ⑫ | The Result of Evaluation by ROM |
|---|---|---|
| 1 | 1 | Character/Line Images |
| 1 | 0 | Images Having Sharp Edges |
| 0 | 1 | Ordinary Images |
| 0 | 0 | Halftone Images |

The output signal "00" of the total image type decision ROM 50 corresponds to a halftone picture, indicating that the picture information signal is to be averaged. The output signal "01" corresponds to an ordinary image which falls outside the category of halftone image or character/line images. The output signal "10" corresponds to a image having sharp edges, indicating that the high frequency range of the image information signal has to be stressed. The output signal "11" corresponds to a character/line image, indicating that the high frequency range of the image information signal has to be stressed. That the most significant bit output ⑪ of decision ROM is 1 indicates that the variation in density of the image read is great. The output signal of the decision ROM is applied to binary encoding/dithering selecting circuit 14 as later described. When the output signal J of the image-type decision ROM is 11, the binary encoding/dithering selecting circuit 14 selects the binary encoding of the image information signal based on a fixed threshold value. On the other hand, when the output signal J of the decision ROM is 10, 01 or 00, the circuit 14 selects the dithering of the image information signal.

MSB ⑪ of the output signal J of decision ROM 50 is applied to the fifth circuit 60 as well. This circuit 60 includes one-pixel delay circuit 61 and one-line delay circuit 62. The output bit delayed by a time corresponding to one pixel by the one-pixel delay circuit 61, and the oldest three bits of the output bits of decision ROM delayed a time corresponding to one line by the one-line delay circuit 62 are applied to the ROM 50 as mentioned before.

The geometric arrangement of pixels corresponding to the bit signals applied from the fifth circuit 60 to the image-type decision ROM 50 will now be described. Referring to FIG. 10, it is assumed that a pixel which is now being processed is i0,0. Thus, the output signal of the one-pixel delay circuit 61 is an MSB output of the decision ROM 50 for the pixel i-1,0 adjacent to the pixel i0,0. The three bit outputs of the one-line delay circuit 62 represent outputs of ROM 50 for pixels i-1,-1; i0,-1; and i1,-1 on the immediately preceding line. That is, one-line preceding decision outputs and one-pixel preceding decision output are fed back to decision ROM 50. The aim of this feedback is to reduce decision error possibly made in evaluating a pixel now being processed, by taking account of decision results for surrounding pixels. For example, if the surrounding pixels have been decided to correspond to part of a character, the pixel which is now being processed can also be expected to correspond to part of the character. For this reason, account is taken of the previous decisions for preceding pixels.

The contents stored in the decision ROM 50 will now be described. As shown in FIG. 11, with respect to a case where all the MSBs of output signals J of decision ROM for pixels i-1,-1; i0,-1; i1,-1; and i-1,0 are 0, i.e., where a image indicates a slow variation in density, in the decision ROM are stored the contents as shown in Table 2.

TABLE 2

|  |  | ③ | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|
|  |  | ④ | 0 | 0 | 0 | 0 | 1 | 1 | 1 | 1 | 0 | 0 | 0 | 0 | 1 | 1 | 1 | 1 |
|  |  | ⑤ | 0 | 0 | 1 | 1 | 0 | 0 | 1 | 1 | 0 | 0 | 1 | 1 | 0 | 0 | 1 | 1 |
|  |  | ⑥ | 0 | 1 | 0 | 1 | 0 | 1 | 0 | 1 | 0 | 1 | 0 | 1 | 0 | 1 | 0 | 1 |
| ① | ② |  | 0 | 1 | 2 | 3 | 4 | 5 | 6 | 7 | 8 | 9 | A | B | C | D | E | F |
| 0 | 0 | 0 | 0 | 0 | 0 | 0 | 0 | 0 | 0 | 0 | 0 | 0 | 0 | 0 | 0 | 0 | 0 | 0 |
| 0 | 1 | 1 | 0 | 0 | 0 | 0 | 0 | 0 | 0 | 0 | 0 | 0 | 0 | 0 | 0 | 0 | 0 | 0 |
| 1 | 0 | 2 | 0 | 0 | 0 | 1 | 1 | 1 | 1 | 2 | 2 | 2 | 2 | 2 | 2 | 2 | 2 |
| 1 | 1 | 3 | 0 | 1 | 3 | 3 | 3 | 3 | 3 | 3 | 3 | 3 | 3 | 3 | 3 | 3 | 3 |

In Table 2 above, the numeric values 0, 1, 2, and 3 stand for two-bit information 00, 01, 10, and 11, respectively.

The above Table indicates that when ①=②=0, and ③=④=⑤=⑥=1, the output J of decision ROM 50 is "00". On the other hand, when ①=②=1, and ③=④=⑤=⑥=1, the output J of the decision ROM is "11". To explain the significance of this Table qualitativly, the surrounding pixels have been determined such that the image density thereof slowly varies and thus, even if a density variation occurs with respect to that pixel now being processed it is decided that such variation results from noise and the picture density still varies slowly.

Next, as shown in FIG. 12, with respect to a case where i-1,-1=i1,-1=0; and i0,-1=i-1,0=1, the contents as shown in Table 3 below are stored in the decision ROM.

TABLE 3

|  |  | ③ | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|
|  |  | ④ | 0 | 0 | 0 | 0 | 1 | 1 | 1 | 1 | 0 | 0 | 0 | 0 | 1 | 1 | 1 | 1 |
|  |  | ⑤ | 0 | 0 | 1 | 1 | 0 | 0 | 1 | 1 | 0 | 0 | 1 | 1 | 0 | 0 | 1 | 1 |
|  |  | ⑥ | 0 | 1 | 0 | 1 | 0 | 1 | 0 | 1 | 0 | 1 | 0 | 1 | 0 | 1 | 0 | 1 |
| ① | ② |  |  |  |  |  |  |  |  |  |  |  |  |  |  |  |  |  |
| 0 | 0 | 0 | 0 | 0 | 0 | 0 | 0 | 0 | 0 | 0 | 0 | 0 | 0 | 0 | 0 | 0 | 0 | 0 |
| 0 | 1 | 1 | 0 | 0 | 0 | 1 | 1 | 1 | 1 | 1 | 1 | 1 | 1 | 1 | 1 | 1 | 1 |
| 1 | 0 | 2 | 0 | 0 | 1 | 2 | 2 | 2 | 2 | 2 | 3 | 3 | 3 | 3 | 3 | 3 | 3 | 3 |

TABLE 3-continued

| 1 | 1 | 3 | 0 | 1 | 3 | 3 | 3 | 3 | 3 | 3 | 3 | 3 | 3 | 3 | 3 | 3 |

Next, as shown in FIG. 13, in the case of i-1,-1=i1,-1=i0,-1=i-1, o=1, the contents as shown in Table 4 below are stored in the decision ROM.

TABLE 4

|   |   | ③ | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|---|
|   |   | ④ | 0 | 0 | 0 | 0 | 1 | 1 | 1 | 1 | 0 | 0 | 0 | 0 | 1 | 1 | 1 | 1 |
|   |   | ⑤ | 0 | 0 | 1 | 1 | 0 | 0 | 1 | 1 | 0 | 0 | 1 | 1 | 0 | 0 | 1 | 1 |
|   |   | ⑥ | 0 | 1 | 0 | 1 | 0 | 1 | 0 | 1 | 0 | 1 | 0 | 1 | 0 | 1 | 0 | 1 |
| ① | ② |   |   |   |   |   |   |   |   |   |   |   |   |   |   |   |   |   |
| 0 | 0 |   | 0 | 0 | 0 | 0 | 0 | 0 | 0 | 0 | 0 | 0 | 0 | 0 | 0 | 0 | 0 | 0 |
| 0 | 1 |   | 1 | 0 | 0 | 0 | 1 | 1 | 1 | 1 | 1 | 1 | 1 | 1 | 2 | 2 | 2 | 2 |
| 1 | 0 |   | 2 | 0 | 0 | 2 | 2 | 2 | 3 | 3 | 3 | 3 | 3 | 3 | 3 | 3 | 3 | 3 |
| 1 | 1 |   | 3 | 0 | 2 | 3 | 3 | 3 | 3 | 3 | 3 | 3 | 3 | 3 | 3 | 3 | 3 | 3 |

Each of these tables is provided in the decision ROM for every one of 16 ($=2^4$) values which can be taken by the 4-bit output signal of the feedback circuit 60.

A sixth circuit 70 selectively applies one of the three signals—brightness image-information signal I, high-frequency stressed brightness signal, and averaged brightness signal—to the color conversion circuit 12 in accordance with the image quality, i.e., in accordance with the output signal J of the decision ROM 50. As shown in FIG. 3, the sixth circuit 70 includes delay circuits 71 and 72 provided for synchronizing the output of this circuit 70 with the output signal of the decision ROM 50, a subtractor 73 to prepare a differentiating signal, a multiplier (ROM) 74, an adder 75 to prepare a high-frequency stressed signal, and a selecting circuit 76. Output signals of the delay circuit 21 and LPF 23 of the first circuit 20 are delayed by the delay circuits 71 and 72, respectively. The output signals of the delay circuits 71 and 72 are applied to the subtractor 73 in which the differentiating signal is produced. This differentiating signal is multiplied by K in the multiplier 74. The output signal of the multiplier 74 and the output signal of the delay circuit 71 are added together in the adder 75, to form the image information signal whose high frequency components are stressed. The output signal of the delay circuit 71, i.e., the brightness signal I, the output signal of the adder 75, i.e., the high-frequency stressed brightness signal, and the output signal of the delay circuit 72, i.e., the brightness signal averaged with respect to 3×3 pixels are applied to the switching circuit 76. This switching circuit 76 selects one of those three image information signals in accordance with the 2-bit output signals J of the decision ROM 50 and applies it to the color conversion circuit 12.

In this way, the brightness signal $\bar{I}$ improved in accordance with the image quality is obtained from the image quality improving circuit 19a. This brightness signal $\bar{I}$, the output signal $\overline{C1}$ of the image quality improving circuit 19b for the first color difference signal, and the output signal $\overline{C2}$ of the image quality improving circuit 19c for the second color difference signal are applied to the color conversion circuit 12, the output signals M, C, and Y of which are binary encoded or dithered in the binary encoding/dithering selecting circuit 14 responsive to the output signal J of the decision ROM 50.

The image quality improving circuits 19b and 19c for color difference signals, as shown in FIG. 14, can be constituted by LPFs 120a and 120b like LPF 23 shown in FIG. 3, respectively. Namely, the color difference signals C1 and C2 are averaged with respect to nine pixels. Only the averaging process is sufficient for the image quality improvement in the color difference signals. This is because the resolution of human vision for colors of a is inferior to that with respect to the brightness. For this reason, to sufficiently reproduce a, such a complicated processing as required of the brightness information is not necessary for color information.

The output signals $\bar{I}$, $\overline{C1}$ and $\overline{C2}$ of the image quality improving circuit 10 are applied to the color conversion circuit 12 to be converted into M, C, Y signals suitable for printing. The color conversion circuit 12 is formed of a ROM which stores suitable conversion tables. The output signals M, C, and Y of the color conversion circuit 12 are subjected, in the binary encoded/dithering selecting circuit 14, to binary encoding based on the fixed threshold value or dithering processing.

The binary encoding and dithering processings will now be described. In principle, character/line images are binary encoded on the basis of a fixed threshold value, while other images are dithered. However, the character/line images must be displayed with high resolution. Accordingly, a image information signal whose high frequency components are stressed is necessary for reproducing the character/line images. On the other hand, halftone images are dithered since they must be displayed in continuous tones. In many cases, a halftone image information signal has very high frequency components, which is attributable to the nature of halftone images. For this reason, when the halftone image signal is dithered as it stands, noise will appear prominently. Accordingly, an average signal is used for the halftone image signal. A image information signal corresponding to a image other than character/line image and halftone image are used as it stands.

When the output signal J of the decision ROM 50 is "11" or "10" corresponding to character/line pictures, the switch circuit 76 selects the high-frequency stressed image information signal from the adder 75. When the output signal J is "00" corresponding to dot images, the switching circuit 76 selects the averaged image information signal from the delay circuit 72. In case of images other than character/line images, sharply edged images, or dot pictures, the output signal J is "01", causing the switching circuit 76 to select the output signal of the delay circuit 71, i.e., the non-processed brightness signal I.

As mentioned before, the image information signals $\bar{I}$, $\overline{C1}$ and $\overline{C2}$ are converted, in the color conversion circuit 12, into color signals M, C and Y each of 6 bits. In this case, the color conversion circuit 12 may be arranged to produce a black-and-white signal to intensify contrast. These color signals are binary encoded or dithered, in the binary encoding/dithering selecting circuit 15, in accordance with the output signal J of the decision ROM 50 in the image quality improving circuit 10. The binary encoding/dithering selecting circuit 14 processes each color signal. As mentioned above, J=11 stands for character/line images, J=00, halftone images, and J=01 or 10, other pictures. However, the binary encoding/dithering selecting circuit 14 is arranged to select, when J=11, the binary encoding of image information based on a fixed threshold value, and, when J=00, 01 or 10, binary encoding based on the dithering technique. The binary encoding/dithering switching circuit 14 can be constructed in accordance with the teaching described in the above-mentioned prior application. Briefly speaking, the circuit 14 may be arranged such that a fixed threshold value memory for simple binary encoding, a threshold value memory for dithering binary encoding, and a comparison circuit are prepared and one of the memories is coupled to the comparison circuit in accordance with the output signal J of the decision ROM. Further, the binary encoding/dithering switching circuit 14 may be inexpensively constructed with the use of a ROM common to color signals and a multiplexing technique. The color printer 16 realizes color printing by thermal printing technique based on the plane sequence system using sequentially processed color signals.

According to the above-mentioned arrangement, in the case of character/line pictures, a image information signal read by the image sensor has its high frequency components intensified and is then binary encoded on the basis of a fixed threshold value. Thus, a clear output image can be obtained from the color printer. On the other hand, where image is a halftone image, the image information signal is averaged and then dithered. Therefore, the noise which has been produced in reading the halftone picture are eliminated. Where picture is other picture than character/line image and halftone image, the image information signal is processed by ordinary dithering technique, whereby a pleasant continuous tone image can be presented.

A image information processing apparatus according to a second embodiment of the present invention will now be described with reference to FIGS. 15 to 21. In FIG. 15, a image information signal I is applied to a simple binary encoding circuit 502 through an input terminal 501. The image information signal I is an 8-bit digital signal corresponding to an output signal delivered from the image sensor as in the first embodiment. To simply binary encode the signal I the most significant bit of signal I may be used. One-bit output signals of the binary encoding circuit 502 are sequentially stored, for each line, in one-line memories 504, 505, and 506 through a multiplexer 503. 3 bits are simultaneously read from each of the one-line memories 504, 505, and 506 to be applied to 9-bit address input of a first decision ROM 507. This ROM 507 stores first image-type decision codes each composed of 2 bits, e.g., "10" for a pattern (including part of a continuous-tone picture pattern) near to character/line image, "01" for a pattern near to halftone images, "11" for a pattern near to continuous-tone image, and "00" for other image patterns. The 2-bit output signal of the ROM 507 is applied to an integral decision ROM 508.

On the other hand, the image information signal I from the input terminal 501 is binary encoded in a comparator 509 on the basis of variable threshold values, i.e., dithered. This comparator is supplied with threshold value data from ROM 501 storing 3×3 threshold values. To the address input of ROM 510 are coupled a counter 511 for counting pixels in the main scanning direction (line direction) of the array of 3×3 pixels, and a counter 512 for counting pixels in the sub-scanning direction (the direction perpendicular to the line direction). Thus, addresses of ROM 510 are sequentially designated, whereby threshold value data arranged in accordance with 3×3 pixel array are sequentially read out. As a result, the image information signal I is dithered in the comparator 509. The dithered image information signal is sequentially stored for each line in one-line memories 514, 515, and 516 through a multiplexer 513 3 bits are simultaneously read from these memories to access a second decision ROM 517. In this ROM are stored second image-type decision codes each composed of 1 bit, e.g., "1" for a continuous-tone pattern which slowly varies, and "0" for other image patterns. The second image-type decision code signal from the ROM 517 is applied to the decision ROM 508.

The decision ROM 508 is accessed by the first image-type decision 2-bit code signal, the second image-type decision 1-bit code signal, and the 1-bit signal (which indicates a preceding decision result) of a latch circuit 518 which holds a 1-bit output signal of ROM 508, to thereby integrally determine the type of an input image. The decision ROM 508 discriminates character/line images from other images in response to a 4-bit address input signal mentioned. A 1-bit decision output signal of the ROM 508 is coupled to a multiplexer 523 to selectively couple one of output signals 520 and 521 of one-line memories 505 and 515 to output 522.

The image-type decision principle used in the embodiment of FIG. 15 will now be explained. FIGS. 16A, 16B and 16C show part of binary encoded patterns well produced when binary encoding a image information signal corresponding to character/line images. As can be seen, with character/line images white or black appears somewhat continuously. Part of a continuous-tone image, as well, represents such a pattern. On the other hand, halftone image in may cases present such patterns as shown in FIGS. 17A, 17B and 17C. A variable-density image well presents such patterns as shown in FIGS. 18A, 18B, 18C and 18D. Part of characters also presents such patterns as with the variable-density image. The use of binary encoding patterns for 3×3 pixels would make it possible to roughly discriminate between character/line image, halftone, and continuous-tone image.

Image discrimination by binary encoding patterns based on the use of variable threshold values will now be described. FIG. 19 shows an example of variable threshold value table. The numeric values of 1 to 9 represent nine levels of picture density. Where 3×3 pixels each having a density of level 5 are binary encoded on the basis of this variable threshold value table, the resultant binary encoding pattern becomes as shown in FIG. 20A. Where image density varies slowly as in a variable-density image, the density variation within the 3×3 pixel array is, usually, to an extent of ±1 or ±2 levels. For example, where the 3×3 pixels each have a density of level 5 and the variation in density is ±1, the binary encoding pattern varies as shown in FIG. 20B or 20C. With respect to such a pattern, the second decision ROM 517 stores "1" which indicates the continuous-tone image.

Where a density level variation within the 3×3 pixel array is as wide as 4 levels as shown in FIG. 20D, the image cannot be regarded as a variable-density image whose density slowly varies. With respect to such a pattern, the ROM 17 stores "0". In this way, a variable-density image can be discriminated by the second decision ROM 517 from other images.

Images are continuous. Therefore, the decision on the preceding pixel is very likely to apply to the pixel which is now being processed. Therefore, if a feedback loop having a memory such as latch circuit 518 is provided for decision ROM 508, the accuracy of the decision will be increased.

Figure 21:
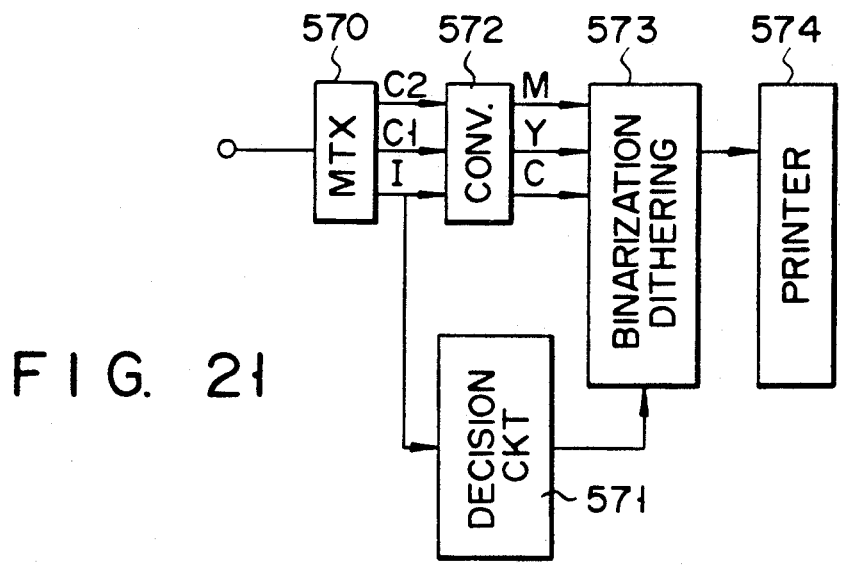
FIG. 21 shows the construction of a color copier which uses the second embodiment.

The embodiment of FIG. 15 may also be applied to processing of color information signals. As shown in FIG. 21, R, G, and B picture information signals are converted, in a matrix circuit 70, into a brightness signal I, and color difference signals C1 and C2. Further, color conversion circuit 572 provides color picture information signal M, C, and Y. These color picture information signals are applied to a color printer 574 through a binary encoding/dithering selecting circuit 573. The brightness signal I from matrix circuit 570 is also applied to a decision circuit 571 as shown in FIG. 21. Decision circuit 571 includes a total decision ROM, which switches the binary encoding/dithering selecting circuit 573. The character/line images are binary encoded on the basis of a fixed threshold value, while the other images are dithered. In this way, even in case of color images, character/line images can be displayed with high resolution, and continuous-tone images and half-tone images can be faithfully reproduced in proper continuous tone.

Figure 22:
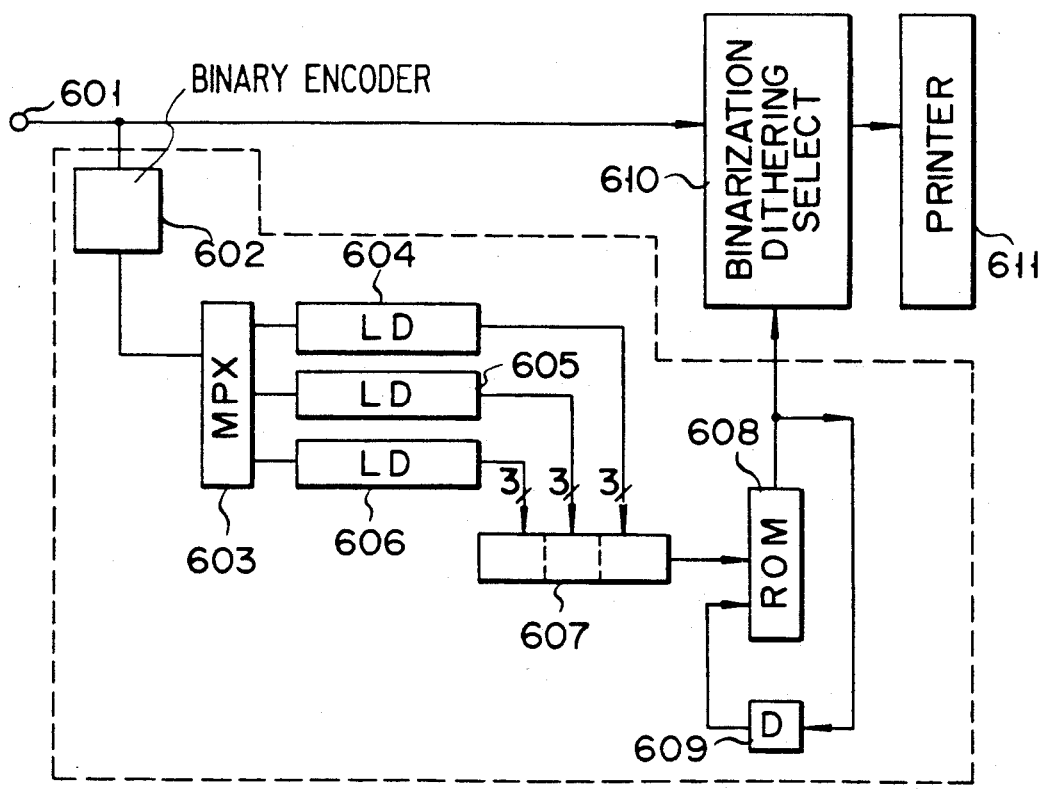
FIG. 22 shows a third embodiment of the present invention.

A image information processing apparatus according to a third embodiment of the present invention will now be described with reference to FIG. 22. The image information signal is applied to a binary encoding circuit 602 through an input terminal 601. In this binary encoding circuit 602, the image information signal is binary encoded on the basis of a fixed threshold value. As stated before, for simplification, the most significant bit of the image information signal may be used as the binary signal. The binary signal from the binary encoding circuit 602 is sequentially stored for each line in one-line memories 604, 605, and 606 through a multiplexer 603. 3 bits are simultaneously read out from the one-line memories to access ROM 607. This ROM 607 previously stores a code "1" with respect to a character pattern, and stores a code "0" with respect to other image patterns.

An output code of ROM 607 is applied to a decision ROM 608, which is accessed by 1-bit output signal of ROM 607 and a 1-bit output signal of a latch circuit 609 which holds an output signal of ROM 608. The decision ROM switches the binary encoding/dithering circuit 610 so as to binary encode, when the input image is a character, the image information signal on the basis of a fixed threshold values, and dither the image information signal when the input image is another image. The picture information signal thus binary encoded or dithered is applied to printer 611. In this third embodiment, by utilizing the continuity of characters in white or black as in the second embodiment, the characters are discriminated from other images. In case of the color images, the arrangement shown in FIG. 21 can be used.

Referring now to FIG. 23, another embodiment in accordance with the present invention is shown which includes an automatic input image type discrimination section. This image type discriminator may be also applied to any one of the aforementioned embodiments.

An input document image is optically read by image sensor 11 (see FIG. 1) to produce an electrical analog image information signal, which is then subjected to analog-to-digital conversion, normalization, compensation, and signal conversion, thereby to obtain a corresponding brightness signal I and color difference signals C1 and C2 in the same manner as described with reference to FIG. 1.

The signals I, C1, and C2 are supplied to the image quality improving circuit 10 shown in FIG. 1 including the Laplacian calculating circuit 20, which extract high-frequency components from the brightness signal I to generate a Laplacian signal binary-encoded on the basis of a fixed threshold value. The Laplacian signal may be 8-bit digital signal.

As shown in FIG. 23, a binary encoder circuit 800 called the "threshold value circuit" is provided to receive the Laplacian signal. This signal is binary-encoded by binary encoder 800 into "1" or "0" on the basis of a preselected threshold value. It is preferable that the binary processing should be performed with a threshold value slightly greater than 0 in light of noise, which reduces the noise influence.

The binary output signal of the circuit 800 is supplied to a delay matrix circuit 802, which is formed of three line delay memories 804a, 804b and 804c and a matrix of 1-pixel delay memories 806 which are arranged to provide a 4×4 image pattern as shown in FIG. 23. An output signal of the delay matrix circuit 802 representing the extracted image pattern is then supplied to a ROM 808.

The ROM 808 may correspond to the ROM 31 of the embodiment shown in FIG. 3. The ROM 808 previously stores necessary code information, which is used to identify the types of input images. While the previous ROM 36 is designed to deal with 3×3 image pattern, the ROM 808 can deal with more greater size of 4×4 pattern. With such an arrangement, the accuracy of image type judgment can be enhanced, although the total data capacity of the ROM 808 is 27 times greater.

The ROM 808 has therein an input/output conversion table wherein, when a certain data pattern is input thereto, a specific output data corresponding to the input data pattern is automatically generated as an "image type discrimination result." For example, when a certain type of 4×4 pixel matrix of local image pattern is input to the ROM 808, the corresponding output data is automatically searched inside the ROM table and extracted therefrom as an image type discrimination data. In this sense, it can be said that the ROM 808 has a function to automatically discriminate the property of an image based on an pattern of a binary high-frequency component extracted from the input image, whereby the input documents may be discriminated to be one of a character/line drawing image, a half-tone image such as a dot-photograph image, and a continuous-tone image such as a photograph. The designing of the ROM 808 will be described in detail later.

The 4-bit output data of the ROM 808 is then supplied, as an image type discrimination result, to a partial image type discrimination data processing circuit 810 for making, by arranging a plurality of pieces of image type data, a total image type judgment with respect to a greater region of the input image including several 4×4 pixel matrix sections.

The data processing circuit 810 includes a series array of 1-bit pixel delay memories 812a to 812g. The outputs of the first three delay memories 812a, 812b and 812c are connected in parallel to three inputs of 3-input/1-output switching circuit 814. The outputs of last three delay memories 812e, 812f and 812g are connected to another 3-input/1-output switching circuit 816 in such a manner that the output of the delay memory 812f is directly connected to a second input of the switch circuit 816 while the outputs of the remaining two delay memories 812e and 812g are insulatively "cross" each other and are connected to a third input and a first input of the switch circuit 816 as shown in FIG. 23. These switch circuits 814 and 816 operate in response to a switch control signal Sc which is externally supplied thereto. A decoder circuit 818 is provided which has two inputs to which the outputs of the two switch circuits 814 and 816 are supplied respectively.

The data processing circuit 810 is connected to a series circuit of 1-pixel delay memories 820 via an adder 822, with which a line delay memory 824 is associated. The outputs of series-connected delay memories 824 are connected in parallel to inputs of an adding circuit 826, which performs an averaging processing for the sequentially delayed pixel data with eight pixels being as a unit, thereby to produce a final image type discrimination data of the input image scanned by the image sensor 11.

The key to provide a high-accuracy image type discrimination in the ROM 808 is that the input/output data conversion table should be carefully prepared by an operator and stored in the ROM 808 as a "automatic image type discrimination table." The basic discrimination scheme of such ROM table may be designed on the basis of the static examination on the specific "nature" inherent to the three different types of input images.

Figure 24A:
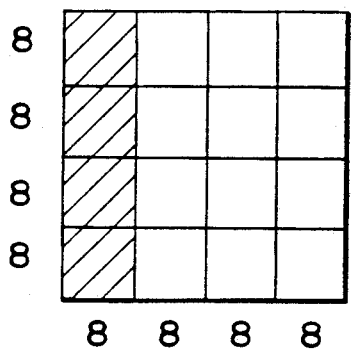
FIGS. 24A and 24B show typical bi-level patterns of Laplacian signals for a character/line-based image.
Figure 24B:
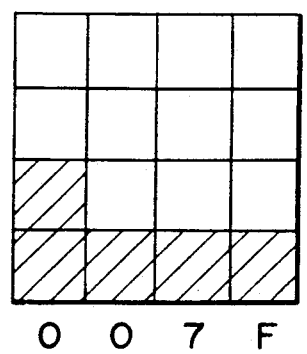
Figure 25A:
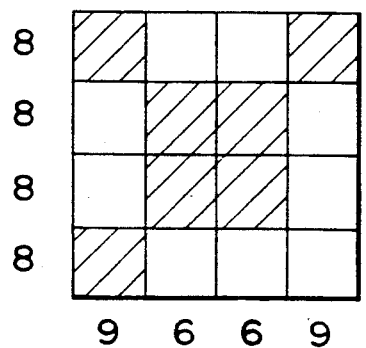
FIGS. 25A and 25B show typical bi-level patterns of Laplacian signals for a halftone image such as a dot-picture.
Figure 25B:
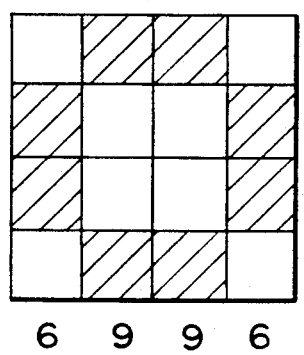
Figure 26A:
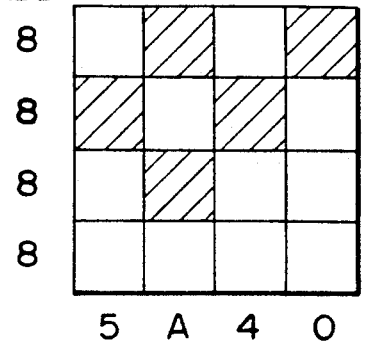
FIGS. 26A and 26B show typical bi-level patterns of Laplacian signals for a continuous-tone image such as a photograph.
Figure 26B:
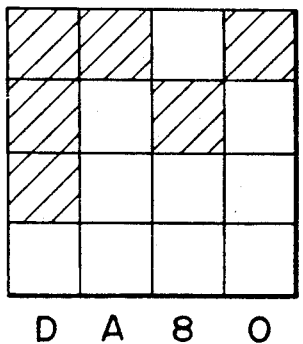

More specifically, if the 4×4 pixel matrix of a local pattern is a part of the character/line drawing image, it is observed to provide a greater number of linked and linear pixels, typical examples of which are shown in FIGS. 24A and 24B. Alternatively, the half-tone picture image commonly involves a number of "dot patterns" that are generated periodically therein; therefore, if the local pattern is a part of the halftone image, it will observed such a periodic pattern typically shown in FIGS. 25A and 25B in the 4×4 local pixel matrix. As a still another case, if the local pattern does not show any one of the two image patterns, and if it has a random dot pattern (typical examples of it are shown in FIGS. 26A and 26B), judgment will be made that it must be a part of the continuous-tone image. These properties can be checked by statistically examining the actual patterns.

The image type discrimination table data to be stored in the ROM 808 may be prepared in the following manner.

First, actual character image patterns of various sizes are input as a training pattern through an optical reader such as the image sensor 11, and binary-frequency component patterns are acquired by the mentioned circuit. Hexadecimal numbers are given to the binary patterns for every 4 bits from the top as in FIG. 24; for example, "8888" for FIG. 24A, and "007F" for FIG. 24B. After various types of character images are subjected to the pattern numbering process, statistics are collected as to how many sample images are true character images. In other words, a histogram is prepared for such analysis; the statistics data should be normalized with the area of an image used for the data collection.

Subsequently, statistics on binary patterns of high frequency components is likewise collected for the halftone image. At this time, statistics data should be obtained using halftone images with different numbers of lines. FIGS. 7A and 7B, which exemplify 3×3 patterns as in the previous embodiment, show the patterns arranged in the order of the pattern numbers (histograms), for example. The histograms of the individual binary patterns show that easily generatable patterns differ between a character image and a halftone image.

The image type discrimination table of the ROM 808 is designed essentially based on the aforementioned property.

Our experiment has revealed the fact that halftone images such as dot-photographs are different from character/line-based images in the frequencies of occurrence of binary patterns of a high frequency component (Laplacian). For each binary pattern, therefore, the ratio of occurrence for the character/line-based images to the occurrence for the halftone images is computed. Based on the ratio of occurrence thus obtained, discrimination result is finally assigned to each of the image patterns, by using "certainty" or "similarity" levels 0 to 7. In this embodiment, the level "7" is assigned to what most looks a character, whereas the level "0" to what most appears to be a halftone image. A pattern which is generated around a character or in a region that contains nothing is called "base patterns," to which "8" or "9" is assigned. A pattern with a single dot only is one example of the base pattern.

With such a scheme, the partial patterns shown in FIGS. 24A and 24B which are discriminated as a character/line-based image (judged to be "6"). The patterns shown in FIGS. 25A and 25B are determined to be a halftone image (determined to be ("0"). The patterns shown in FIGS. 26A and 26B are judged to be "4". This means that these patterns cannot definitely be judged as any one of the character/line-based images and the halftone images, and that these patterns must be parts of a continuous-tone image such as a photograph.

The preferred embodiment of the discrimination table code data which when combined with the ROM 808 illustrated in FIG. 23 will implement the teaching of the invention is given in the Appendix. The ROM code list representing the actual storage contents of the ROM 808 has been prepared by the present inventor for every possible image pattern.

Referring to the Appendix, the left column includes 1,024 different numbers of patterns each of which is represented by four code numbers of hexadecimal addresses, such ask "0000", "0040", etc. Each hexadecimal pattern number is provided with 64 pieces of codes indicating image type discrimination results respectively; for example, "9", "8", "8", . . ., "7" for "0000". In other words, the results of decision for 64 different image patterns per row are illustrated in the Appendix; as there are 1,024 rows in total, there are a total of 65,536 (2 to the power of 16) judgment results shown.

Figure 27:
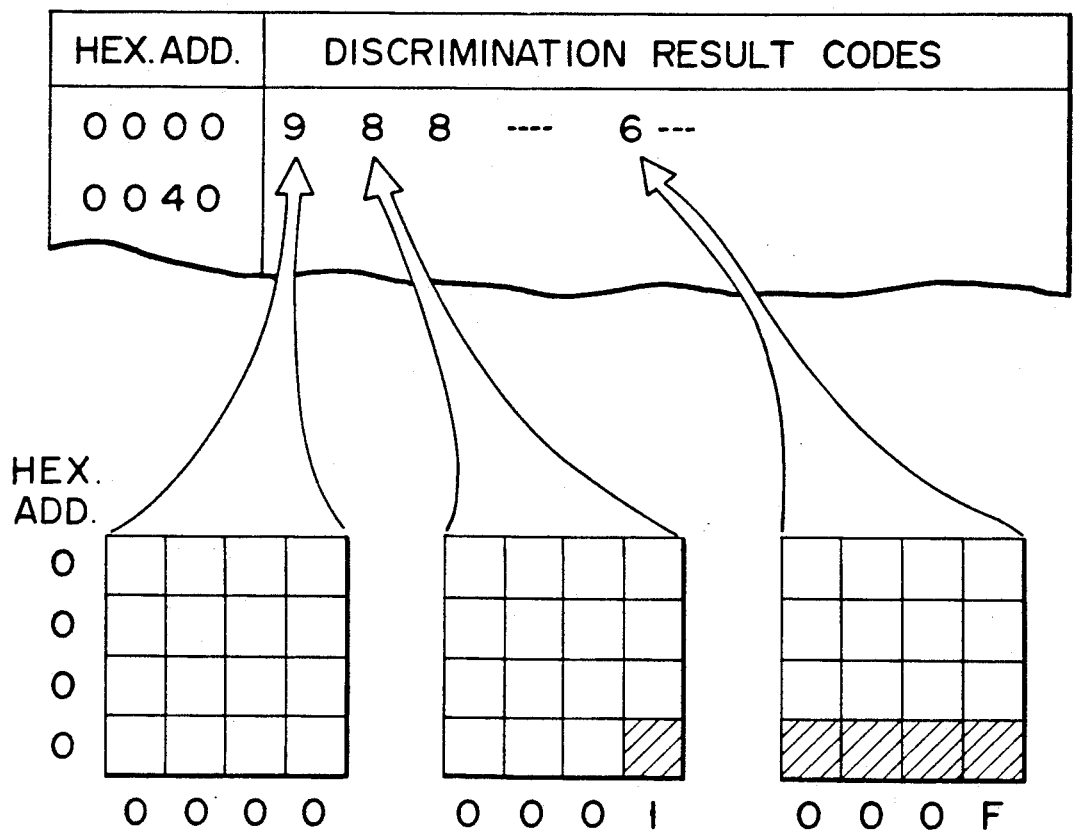
FIG. 27 shows apart of an image type discrimination table prestored in a ROM included in the circuit shown in FIG. 23.

For example, the first code "9", which is found in the first position in the first row just neighboring to the hexadecimal address "0000", represents an image type decision result of a 4×4 pixel matrix input pattern with hexadecimal address "0000, 0000" as shown in FIG. 27. This input pattern does not have any high-density pixels; the output code "9" indicates that such input pattern is a background image region. In other words, when a 4×4 binary input pattern of a high frequency component (Laplacian) is input as an address "0000, 0000" to the ROM 808 with the above table contents, it automatically outputs the code "9" as an image type discrimination result.

Similarly, a code "6" appears at the fifteenth position in the first row of this ROM table shown in Appendix. This code is prepared to represent an image type discrimination result for an input pattern addressed with "0000, 000F" as illustrated in FIG. 27. As explained above, the code "6" indicates that the input pattern can be judged at higher level as a part of a character/line-based image.

After the code table presented in Appendix is installed and stored in the ROM 808 as an "image type discrimination code table", the ROM 808 can function to automatically output a suitable code data which corresponds to an image pattern of 4×4 pixel matrix input thereto with specific hexadecimal addresses, and which is an image type discrimination result for the input pattern.

Successful image type discrimination is highly expectable by using the aforementioned image type discrimination process using the ROM 808 with respect to every high-frequency (Laplacian) pattern of 4×4 pixel matrix. This very use of the high-frequency component however causes the image type discrimination to be easily affected by possible noise. To minimize such a noise problem, and to improve the maximum accuracy of image type discrimination, the discrimination results output of the ROM 808 is subjected to several kinds of averaging effected by the circuits 810, 820, 822, 824, and 826.

Practically, a character/line-based image region and a halftone image region are not often jumbled together, and are separated from each other. Simple averaging however allows the periphery of a character/line-based or halftone image to be averaged together with the result of the judgment of a region therearound. Even if the edge of a character is correctly discriminated to be character (determined to be "7") through the first judgment by the ROM 808, averaging may lower the judged value as low as "4." Around a character in an input image such as a paper document is often a background pattern or base pattern. For the base pattern, enhancement of the high-frequency component for improvement of the image quality or filtering based on a low-pass filter characteristic to remove noise does not deteriorate the image quality. With such a base pattern existing around a character, a line drawing or the like, therefore, the judgment by the ROM 808 for the edge portion of a character can be maintained by considering the base pattern around the region that has been discriminated to be a character, then averaging the result, not just by simple averaging of the judged result of the ROM 808. In other words, it is possible to perform high-frequency enhancement for the edge of or a character and output the processed results. This enhancement can be successfully effected by a specific technique that will be described below.

The discrimination result code output of the ROM 808 may be a 4-bit code having the most significant bit H3 indicating a base pattern and lower three bits H2, H1 and H0 showing the similarity level of a character, as presented in Table 5.

TABLE 5

| Output Code | | | | | Similarity of Halftone | Similarity of Character |
|---|---|---|---|---|---|---|
| Back. H3 | Discrimination results H2 | H1 | H0 | | | |
| — | 0 | 0 | 0 | (=0) | Max. | Min. |
| — | 0 | 0 | 1 | (=1) | | |

TABLE 5-continued

| Output Code | | | | | Similarity of Halftone | Similarity of Character |
|---|---|---|---|---|---|---|
| Back. H3 | Discrimination results H2 | H1 | H0 | | | |
| — | 0 | 1 | 0 | (=2) | | |
| — | 0 | 1 | 1 | (=3) | | |
| — | 1 | 0 | 0 | (=4) | | |
| — | 1 | 0 | 1 | (=5) | | |
| — | 1 | 1 | 0 | (=6) | | |
| — | 1 | 1 | 1 | (=7) | Min. | Max. |

("—" is "0" or "1")

The code output of the ROM 808 is sequentially delayed by the series array of 1-pixel delay memories 812a to 812g included in the circuit 810. The 1-pixel, 2-pixel and 3-pixel delayed outputs of memories 812a, 812b, 812c are supplied to the switching circuit 814 serving as a first selector. The 5-pixel, 6-pixel and 7-pixel delayed outputs of memories 812e, 812f, 812g are supplied to the other switching circuit 816 serving as a second selector. The selectors 814 and 816 effect switching operation in a synchronized manner so that each selector sequentially selects one of the three inputs.

More specifically, the first selector 814 generates the 1-pixel delayed code, while the second selector 816 generates 7-pixel delayed code, whereby a couple of patterns distant by 6 pixels from each other are compared with each other. The selector 814 then generates the 2-pixel delayed code, while the selector 816 generates 6-pixel delayed code, whereby patterns distant by 4 pixels from each other are compared with each other. Thereafter, the selector 814 generates the 3-pixel delayed code, and the selector 816 generates 5-pixel delayed code, whereby patterns distant by 4 pixels from each other are compared with each other.

Assuming that each of the output codes selected by the first selector 814 is represented by "X0, X1, X2, X3", and that each output code selected by the second selector 816 is represented by "Y0, Y1, Y2, Y3". The decoder 818 generates a code indicating high-precision image type discrimination result for each pair of the code outputs of the first and second selectors 814 and 816, by utilizing a logical equation defined by an internal conversion table prestored in the decoder 818. The conversion table is illustrated in Table 6 presented below:

TABLE 6

| | First Selected Input Codes | | | | Second Selected Input Codes | | | | Output Codes of Decoder 818 | | | |
|---|---|---|---|---|---|---|---|---|---|---|---|---|
| | X3 | X2 | X1 | X0 | Y3 | Y2 | Y1 | Y0 | Z3 | Z2 | Z1 | Z0 |
| 1 | 1 | * | * | * | 1 | * | * | * | 1 | *(0) | | |
| 2 | 1 | * | * | * | 0 | * | * | * | 0 | Y2 Y1 Y0 | | |
| 3 | 0 | * | * | * | 1 | * | * | * | 0 | X2 X1 X0 | | |
| 4 | 0 | 0 | * | * | 0 | 0 | * | * | 0 | Min (Y1-Y0, X1-X0) | | |
| 5 | 0 | 0 | * | * | 0 | 1 | * | * | 1 | *(0) | | |
| 6 | 0 | 1 | * | * | 0 | 0 | * | * | 1 | *(0) | | |
| 7 | 0 | 1 | * | * | 0 | 1 | * | * | 0 | Max (Y1-Y0, X1-X0) | | |

As understood from viewing Table 6, when the selected codes $X_i$ and $Y_i$ ($i=0, 1, 2, 3$) are both base pattern (case 1 in Table 6), the 4-bit output code $Z_i$ ($i=0, 1, 2, 3$) of the decoder 818 is obviously a base pattern. When the second input code $Y_i$ is not a base pattern (case 2), the output of the decoder 818 is the same as the code of the second input code Yi. When the first code Xi is not a base pattern (case 3), the code of it is output directly. When neither the first code Xi nor the second code Yi is a base pattern, and if the second highest bit is "0" in other words, when both parts Xi and Yi look like a halftone image (case 4), that of their codes which has a higher similarity to a halftone image is output. As in the cases 5 and 6, when neither the first part Xi nor the second part Yi is a base pattern and the second highest bits do not coincide with each other, i.e., when one of them is a character-like pattern while the other is a pattern similar to a halftone image, nothing specific can be said about them so that they are replaced with a base pattern. Lastly, as in the case 7, when neither the first part nor the second part is a base pattern and the second highest bit is not "0," i.e., when both parts look like a character, that of their codes which has a higher similarity to a character is output by the decoder 818.

Through the above transformation, of codes to be discriminated, base image codes around a character or halftone image on an input image is replaced with a character code or a halftone image code, respectively. Accordingly, the subsequent averaging can reduce an error occurring in the judgment of the edge portion of a character. Then, the thus replaced code is subjected to averaging of 2 rows×8 pixels (16 pixels in total). More specifically, the replaced code is sent to the adder 822 where it is added to a code delayed by a line delay 824, the added code is then delayed by eight pixels by the series array of 1-pixel delay memories 820, and the delayed results are added and averaged by the adder 826. In this manner, the accuracy of the judgment can be improved.

A description will now be given of a still another embodiment which uses such an image recognition circuit to improve the image quality.

Referring to FIG. 28 (those elements common to the original FIG. 1 are given the same reference numerals while those different elements are denoted by different numerals), an original or an input document 2 is illuminated by a light source 1 and the image of the document 2 is formed in a CCD sensor 4 by means of an image pickup 3. The CCD sensor 4 converts the image into an electrical signal which is in turn amplified by an amplifier 5. The amplified signal is converted into a digital signal by an A/D converter 6. The digital signal undergoes unevenness compensation in a compensator 7. The operation up to this stage is essentially the same as done in the previous embodiment. Then, the optical signal is converted into a signal representing the amount of ink by a color converting circuit 12. This conversion system may also be the same as the one employed in the previous embodiment.

The quality of the image is then improved by an image improving circuit 900. Unlike the previous embodiments, this embodiment discriminates the type (property) of an input image signal, controls the high-frequency enhancement, low-pass filtering and gamma characteristic according to the discrimination signal, and sends the resultant image signal to a color printer 16, which can record multiple gradations. Through the above processing, an image such as a character will have its edge sharpened by the high-frequency enhancement while a halftone image or the like becomes a smooth image without moire noise by the low-pass filtering.

The image improving circuit 900 will be described in more detail with reference to FIG. 29. The output of the color converting circuit 12 is converted into individual ink-quantity signals, yellow (Y), magenta (M) and cyan (C). As the color printer 16 can print only one ink color at a time, the outputs of the color converting circuit 12 ar generated one color component or ink-quality signal Y, M or C at a time to match the performance of the color printer 16. The ink-quality signal is delayed by a delay circuit 902 to be a signal x and is also processed in a low-ass filter 904 to be a signal x'. The difference between the signals x and x' is then computed by an arithmetic operation unit 906 to provide only a high frequency component (x—x'), which is in turn sent to an image type discriminator 908 that discriminates the type (property) of an image as described earlier.

The high frequency component (x—x') and the delayed image signal (x) are respectively supplied to delay circuits 910 and 912. In accordance with the discrimination signal, the high frequency component is multiplied by a constant K by a multiplier 914; this may be done using a ROM table. K is variable according to the discrimination signal. For instance, when the image shows the most character-like property (when it is discriminated to be "7"), the proper K would be about 8, and when it is determined to be a halftone image (judged to be "0"), it is proper to set K= −1. This signal K(x—x') is added to the signal x in an adder 916. The resultant signal is x+K(x—x'). When K=0, this signal becomes the original signal x, and with K= −1, it becomes the output signal of the low-pass filter. When K is equal to or greater than 1, the signal becomes x+K(x—x'), which is the high frequency component (x—x') added to the original image to thereby enhance the high frequency component. In this manner, with the values of K made variable between 0 to 8 according to the signal of the discriminator 908, a high frequency component can be enhanced using the low-pass filtering that cuts off a high frequency component.

Then, the gamma characteristic is changed by the signal from the discriminator 908 to convert a character/line-based image into a clear and sharp image signal. That is, when the image is judged to show the most character-like property (when it is judged to be "7"), the gamma characteristic is made sharp by a gamma compensation circuit 918 to provide a sharp image signal as per the previous embodiment. The gamma circuit 918 may be designed to permit recording of a plurality of gamma characteristics using a ROM and select the proper characteristic according to the discrimination signal.

```
0000: 9885833583345456850602262314142780140236000302461415013713148347
0040: 8000103400224366002108231144114608131146811434661335044701420467
0080: 8201012253246467020301012314341601012424018114360203142602141156
00C0: 1108113443135477001101232244346610003446314452774445475645775767
0100: 8302000022131112352600053425021502010401122404036370137052702447
0140: 0002010204440212004402121244124604020403144424222145234624444667
0180: 0002010230242121130201023345140504142414121414242414141424163246
01C0: 0114020222442422004411242344447041405052444341446463246666767677
0200: 8000000000000001002102440040203420813042100000100133502450112002 3
0240: 0314021400440122144442444414422440124214500221154246614570142215 6
0280: 0002142400120014004214440044014402044444010224140115444411251244
02C0: 0244142400440344144444441144124402121444213432553445444622664466
0300: 1008010200010002342302121021011111104042301010204464703460225013 5
0340: 0224041202440114144412442240244211404340444143245573467014234 77
0380: 0212042410220122114404442344012404142444014041423441424244604 26
03C0: 0244022402440114144411441124401440424041324534345656466765465577
0400: 8000000000000001001001210040224400001412302144420010442420434444
0440: 0001020804130100042004121444244002122451011425402131134521422445
0480: 0000244400231242001044440041244414224444414244441141444441424444
04C0: 1000314231205253014112441142554420126455414162763244646424456 66
0500: 0001000000420010002100421042404414444444444444441224444424444444
0540: 0034001424441222004400422144223441414244444444444421442246444244 44
0580: 0144442411421440114444441444444444444444444444444444444444444441
05C0: 0242144414442444014422244144444442444444444444444424465442444677
0600: 0000000000000000042244400222144000214210011221121131444004142 42
0640: 0012012100422111124442442044424500333466004131653337246710422466
0680: 0022424400412244002224440041214412444444202244452141444440214 444
06C0: 2014144410423142244442441044114431223466304472765364645633454 567
0700: 100000000011000220411442002224142213242204444422454544461142 2445
0740: 0142021112440402214411444444416342424210224243266672177114446 77
0780: 0444444014214240144444400444214244444442444444422444444422444 442
07C0: 0424144341112244024424441244224444264452444465576557557765676 677
0800: 8201010132012302030202002001124210000010412242202014021224443 2
0840: 010002002244114021111242444440102402444424320203140144544454
0880: 3300220154026555130104003142525010144140222142502144424031444 47
08C0: 3000323465127777221311144442454522244461436546746364646662767 67
0900: 0000000000002120200000011111102010402244424221403004021444444
0940: 02020402244142202120111444441114040404014444441402011402444441 22
0980: 1001010120012101120101012313131604041414241424142414240414252436
09C0: 120404044443404212212034444416041404022444142245353735577555 57
0A00: 0000040100001200014244241144444402012412040244420112444424442444
0A40: 1444444444444444444441424144444444442444444444444444
0A80: 0104244400001224044444441144444402024444010244240424442411244444
0AC0: 1244244424144444444444444424244441424426442644472456 4447
0B00: 0000020000000002222144400421242040114020404142224111422142244 24
0B40: 144404244444214444424444444444242414024444241424242446444444 42
0B80: 0202141200010242214214440021144404022424020244422534444426162455
0BC0: 1444042414441424244444444411444042414245422441557661445754666 67
0C00: 1000000000108122010012222041224200002411224144240000044212221444 4
0C40: 1000020114241340020114144444442001143314444442030324134244454 4
0C80: 3100221140213121120044421341444412104444422244441110444442414 44
0CC0: 4000424362317565221044223444464403354675144727756455467656566 77
0D00: 000000000020000000100014204221220244214444444111014422444 4444
0D40: 0011000244441422004200244244224241224014444442405142221444442 45
0D80: 2011244420422242201142441044214444244444444444444241444444444 44
```

```
0DC0: 21141222444412242242231455644464524242444444444625716644675466657
0E00: 1000010C00000010200414442414442440100441012242412031222444442444
0E40: 202414222444342222444444444444443022222342144412444624554445642
0E80: 201242440044122400444444104244442414444414144446022444422424444
0EC0: 41424444514452652244444422444442612464776116747765656756755567777
0F00: 420200122001212343232143004332543423243012124433564444243346442
0F40: 3124213342443203444424454444456524245342454244766674656664465
0F80: 4023244530123334344444304444464424444544444456565544466646655
0FC0: 53444422634446475646544566455667664664576665746777777777777777
1000: 832322344223434534141325234413460013120500112141303142427124224
1040: 00000010002122230042012113442445000101020051022300120125124434
1080: 21002114421354555011112421241445502121424141444560122242412244447
10C0: 000000012011234500410014014422470201020312521245230402162446466
1100: 54141102431312145627121545461447028304021424440646470447132606
1140: 000300010044010101420211114402440100020112420203002304352244254
1180: 3014010142422324231201134473537142444242424442521144416145716
11C0: 10120102014203140022001432444426021404041452143736462436456746
1200: 0011041200130011224444442144444481011424001212221442444451444244
1240: 00410222302201144444442244444400010401001101212242444211441142
1280: 014444440044244424444444214424442442444412144414444444222444444
12C0: 012424240042012444444444441222142400202214444452544445
1300: 431102122240102664612462345014433042244602340225666722672346034
1340: 012201020144020222441444144402241121114340111122454563277214224
1380: 222414401440244444424413441444144444414021404445644442546154
13C0: 054402241144021214442444544514463444243442022537677741665676577
1400: 0000001000401040000404242404444444430204424414244442134344444244
1440: 000000000040112100221122414442440000000411104004411141444222424
1480: 102014441044444421444444404444444444444144244444144444444444
14C0: 0000000500401241014422244214444440010043301201231134544444244444
1500: 0022004010442040014410440440444444444444444442444444444444
1540: 002100241144214200440244114411422242444241142411422245444452
1580: 12444444221444432214444441214444441441444441444444444444
15C0: 014401441140444004411441214444344244444444424544444644524454
1600: 80212421004111114144444440444444102144441022444114244424042
1640: 002012440044010134244444444444001002110C20000241224444204432
1680: 1044444410424444414244444404444444444441114444444444442444444
16C0: 0042144200420132444444411144211012214220011223424444442144444
1700: 30421222114221111044224421444242422444440441441452544544444144241
1740: 2142044101440203114502460144034431242446002212216566327702452
1780: 22444441124411442444444421444444444444444444444444444444444
17C0: 344424254414222125442444433443464145454453654476667476655777
1800: 2100010020222111200102241242444401002401411144422214421444444
1840: 00000000021241402124222424444444000004014242441442224444444
1880: 33021200421153140011421112444446121144424414444421424424244444
18C0: 110000123014524032121021144446020304022201442402342233444454
1900: 210000110200000330300121141104304011401444444444140344112444444
1940: 010101012444040211441114144442440101040144441424142212034444244
1980: 30010103212411424130202341434054214441424044051426441424374437
19C0: 21040100322224020024130314444567041104032412342635461227764555
1A00: 122144241442421444444444444444241244444422444442444444444444
1A40: 444424422444442444444444444444421414222442444424444444444444
1A80: 12244444122444424244444444444424144444120444444444444444444
1AC0: 24442424142421444444444444445024415020023404444544544444444
1B00: 2111141400111110414444441144214214222424241244243446444444424445
1B40: 14240412444414044444444444441422040444240404214624444444444425
```

```
1B80: 2142244432112244442444441344444441444441212444556444445244644566
1BC0: 1444040452441404444444445444524544240435321232366756446755666677
1C00: 1000111010401012104044441144444421104424444444442520444444444444
1C40: 0000000051445202221414241424444400001100424124114441422242444444
1C80: 0100244413425441212144442144444424224444444444444442444444444444
1CC0: 0000000020104122114142414242454410003200441234133424454654444445
1D00: 0000002010411030004110422042204242244444444444442244444444444444
1D40: 1112001224441114104110414444414444244401444444242424422644444444
1D80: 2322244410244244104244442244416444444444444444442444444444444444
1DC0: 2122143422244435212523462342674724444414444444446525265745446657
1E00: 0210441010201100424444442444444222344222444422444644444444444444
1E40: 0011240012210200444444444444445114024002242141044254445444444444
1E80: 2242444222441424444444442444444452444444222444444444442444444
1EC0: 0022241121242203444444444444441402241101123445664644444244447
1F00: 4333213022122203366424444414442454434442544244422673644445444555
1F40: 2344042124442405244442444444443444343122440426566644574444467
1F80: 6245424443242425554444447346444524244445254544677444446444444656
1FC0: 6443143552443436754525465745664766464456662656677777577777767777
2000: 8202001321013023010302020011141201020424020114210103141412222414
2040: 0000021101242244024212444444424444020104232444144404151444424444456
2080: 0000010010002023000001010113011202014424010124240102442202112426
20C0: 0000020000112133000011111142142201021214121224160302142421224457
2100: 0101010121120101220102021442041424114244444242614142424242416
2140: 1414040444441424244424444444444444424144444444444444442444444444
2180: 0101040202120202000102040002010244444444441424142422442424242415
21C0: 0402040214440422144212224442442444244444444244424242444444444446
2200: 1100010000001000081114440041122210440446022302360045144601041446
2240: 0214021401440514444444442444444023404561244346712452456224444477
2280: 0000041400000000100000242002102220103443100231432020224240135446
22C0: 0102020200220012024422441004401440223144303342646231624450345476
2300: 1101021100000100342302240114021434470532020204244656054603160406
2340: 1444021424440224244424442444244414440446144244444461457244534366
2380: 0211041200120111001102220112011412144144041404241424444141614415
23C0: 0222041201440132024412120244022214242424244434554345244516555576
2400: 0000010110211221001044420444441411154444444444442241444444441111
2440: 0000040110412224222244444244441221242244444441441441441441441441
2480: 0000241400211224001144241022444444424444444444442444444444441444
24C0: 0000020220413212112342422244442212244244442444624444444444441444
2500: 2444444144444444444424444444444441444444444444444444444441441444
2540: 4224444444444444444444444444444444444444444444444444444144444444
2580: 2444444444422441244444444444444414444444444444444444444441441444
25C0: 2434444444441442441444144444444444444444444444444444444441444451444
2600: 1001020100010100004142400424144203224420013244412444111104544144
2640: 2024040200443454144424444234444231534465012444622642657224445566
2680: 0011242400120141002324440041114121244414144441224444144144441445
26C0: 0012041210243144124142420041242244442662024657644472445344465766
2700: 3112142200220111424444224054444464464465044444465546444433444444
2740: 1442142414442444444442442544346445514444474665527722445476
2780: 0242444400440244024444400424442444444444444442444444444252446
27C0: 0442241224443444124212440241224422444564444547666455647455465676
2800: 0000020011002200010044042144444404014414442444441211442244444444
2840: 0201140444444444444442444444444241244144444444444444444444444444
2880: 0000040110012102000000201021242110201244414044444401244441424444
28C0: 000002011121210112002401444424221402442424244242442242244244455
2900: 0101040111211411010101040014242442244404440444444444441224024444444
```

```
2940: 1412040444444444424441444444442424241444444444444244444444
2980: 0100020101120112010002010002120244244414442444244224441444444424
29C0: 0201040424442444140224024444443444444414444444444444443444444424
2A00: 0100140101002400124244442244444404024424140144141414442444444441
2A40: 2444444444444444444444444444444442424444144444444444444444444444
2A80: 0102241400002442012244441012444401134444002024340112444411154446
2AC0: 1224242414141424244444444444444412324424020544442444426454544447
2B00: 0201141201001400112224442144444414024442240444445254425444444424
2B40: 4444242444444444444444444444444444442444444444444444444444444444
2B80: 1412142201011244122124241242444424144424143244443446242224654426
2BC0: 1424144424443444424444444444442424441444444444445446442624464447
2C00: 0000120120411211100444444444444420044244444444442044444444444444
2C40: 0000121144444442442144444444444414104422424444442441444444444441
2C80: 0000141400212211000024124144444424421444444442444444422444444441
2CC0: 0000020021111423121044222424244444200444442244464442444444444446
2D00: 1402412121441424242444444444444444444444444444444444444444444444
2D40: 4424244444444444444524444444444444444444444444444444444441444441
2D80: 1201441241421224220244244444444444444444444444444444444444444444
2DC0: 1412441444442444241124244444444444444444444444444444444444444441
2E00: 0000140100001200112444442144425412204424441444224244444424444444
2E40: 1124242441444222444444444444442243244424544464242644444444444444
2E80: 2001442400221141111424424104442452032444420314542244444442444444
2EC0: 3000122230113216244444442242444520335455304155674455445742244477
2F00: 4003141100011433424244424444444441444444424444457474424444444446
2F40: 4444244444444444444444444444444664442452444444455647445744444456
2F80: 3342442420442242344242241344444664444444444444444654544452446445 6
2FC0: 4222244444445444124444444444446545454647445746777566556774676 77
3000: 5323303342124234241424451341424701021224141224148114141614 24245 7
3040: 000010230021013312422444444444401110424122214250225144614440246
3080: 1001200100222440013120202441404010244242214444401111421441441 4
30C0: 0000000100000024002112121142224400010414211102452335141623443567
3100: 6434211454442335671621055555243714141432444444416363624465672 557
3140: 00010101242402141444222444444444424120404444414151441142614440447
3180: 2001201221411113231202024400413162424242444141405242614154414051 6
31C0: 0002010101220113012211142344141414440414142404265246241 52644 25 37
3200: 4322223200101321344444411444244314524661224144544774467524652 67
3240: 0010212004411544444444424444452122326500254256346645460 2440276
3280: 001114240011012311424144200422244122144442123142612224444 11442444
32C0: 0000010200140014224444441444444403032416012224363445 445522443 465
3300: 54342444232203447766224745471426525734671246144677671467456 73757
3340: 031201010144021444444144424441246324434550244255755 6634772156 3777
3380: 2114042400220114332222442444413142444444023504251657244645 67263 7
33C0: 0001020044011412443222144414562644345524342646 4676557636 664 677
3400: 0000114110402221234144444444444414144444444 4442424444 42444444
3440: 00000100104012214141424442444442040242241142 4444222 1441 44444444
3480: 0010444414144421224444411421444444444444444 4444444 44444444444444
34C0: 0000000000101131124144424444244441414444 104124434444442542444554
3500: 1224244444444444244444444442444444144444 444444444444444 4444444
3540: 22211442444414444444444444444444444 444444444544444244444 44
3580: 1244224444444144424444444444444 444444 444444444444444 4444 4444
35C0: 0111024412440422414144424444 4444444424442 444444445 4446544 44445
3600: 3111144100211111220424 44440444444414244240 1 2445241 4444 4420444444
3640: 101034420041413342 4444442 4442443 0334465002145 65445446711444657
3680: 2022444400421244414444441044444444441 10424 4544244 4444441442 444
36C0: 1000240210002334244444440044244 620344445100 152552 4444 45401446666
```

```
3700: 5255244412440443534444444414444446256444612442454766644773144454541
3740: 3111222201422234424444443244124672456566224454777667577734454777
3780: 3244444411420441242444431442244444445424454444464444444435444445
37C0: 3112341223242247444242434464756665554655266667776767667556677777
3800: 1001110211204112241144224444444424014424444444242414444444444444
3840: 0000140144442244444444444444444424124422444444244424444444444444
3880: 0200010010002112110042041141241244244444434444422244444244444444
38C0: 0000010001011102121144112444442422134434441444343524424444444445
3900: 3103040214111112212441145442422240244044444424441244124444444444
3940: 0412040424442444444442244444444422341402444444444422442444444444
3980: 1100010331410001301110134012112442244244442444042415442445464425
39C0: 0100010114441204122144144244445442244144444424254425442644455456
3A00: 1212244424114410444444424444444442314444441244244444444444444444
3A40: 2424444444444444444444444444444444444444444444444444444444444444
3A80: 1114444402114445444244444424444424344441031442524454444444444445
3AC0: 0214240202041402444444444444444442224340101143644444444444444445
3B00: 3221142422412421442624444444546542244244444446446474425454544446
3B40: 1444042444444444444444444444444441444144444442444444444644444445
3B80: 4224244411211224464544224544462544254444441244464467444567674567
3BC0: 0224041414441415144444545444454524421436342244454574467655765777
3C00: 8000221021412100422244444444444420444444444444442144444444444444
3C40: 0000111041425110244142424444444422044422444442442244444444444444
3C80: 0000211000402202441044444444444444444444444444444444444444444444
3CC0: 0000000002030224220444244442444422044142224444543244424424444456
3D00: 1101242244441222422244444444444444444444444444444444444444444444
3D40: 1231442444442414444144454444444441444424444244442224445444444444
3D80: 3101222413220202242144424544454444444444444444444444444444444445
3DC0: 0100141212442222251244454544454444452444444444456654444464444426
3E00: 0121441131110134444444444444552233442544244456444444444444444444
3E40: 2021422112102124444444444444224444442224444424654544444444444444
3E80: 4323411422210044114244442444445422244445022144444424444442444445
3EC0: 3002343320003233444544454444464642345455202345656645445746455657
3F00: 5425442544433215664644465445454754654445444444467675644674446455
3F40: 4544444444443425444544445444444644746454445464467656447744565467
3F80: 6424444442562445645444557465614544545454664456666744456665454547
3FC0: 5444543554546466544445667466757665565777746475677767776677777777
4000: 8203001221002133010200020010000300020214012204140002010300210103
4040: 0001002312442141100420022214411440201042424411433401120111122245
4080: 0001010110243122000001010111031204124444242424440111041201140212
40C0: 0112021112443244004201221244212604141445424445446021402253142247
4100: 0102000012200000102000000410112041404241444410202000112101111
4140: 0444021444441444012400442444144424441414444442444124402224442444
4180: 0244040411440440004010222021144444424444444441422040224440412
41C0: 1444142421441424014412444442244444444444444444424244225444442425
4200: 0101020200120111002102120042001440102040200420114020304010022012
4240: 1444144444441444444444444442444142424242444142424442424144422446
4280: 0244144400440444014412240044124424442444244422441244244412243422
42C0: 2444444424441444444444444444444444444444444414442444444444444444
4300: 0211040100220111001202110042014104140414042401202010102012401031
4340: 4444042424440444444424444444412441444142442440244444402462244044
4380: 1444044414440444042404140440422444244444441444144414242240224
43C0: 4444244444440444444244444244244444444444444414444442444444444446
4400: 1001000101000000000001000400041000141125444400000201102022221
4440: 1000424302424366004102231044334201033456224444670012344234634361
4480: 00111442804211420000024200220122424444444444444000204444420214444
```

```
44C0: 00114044014454660024032421442546122444572244546720241447334465556
4500: 00120000114400100022001410442042224444444444444441112121222444444
4540: 01440021444421440042124310443044442424444444444441044302422442544
4580: 12444442244242440144214410422244444444444444444442444444444444444
45C0: 14441424444444440144114411442546444444444444444442444442425444567
4600: 10000000002111100020112400411241200324050044442401031214004124240
4640: 20223144004423242444244411444444304452661144345622464267402544666
4680: 00444444002412440021244400413141142444444244444421041444420221422
46C0: 11444444204445442444444421444445222464562265447643264447444574456
4700: 30110000004200102041022400411241142424221142444233130121002201226
4740: 14442124244404422244334500442144222445462444344423553456004531576
4780: 12442445114244441144442410422445444444444444444442244444442444245
47C0: 24442444424444442444444422444444424442444444464444444525742445477
4800: 02000100111112110000010012421222140114024444444401000040244442422
4840: 21241214444444444424141444444444244414444444444444244244444444444
4880: 21000401242412240000000000021142242414444444444441212442444242424
48C0: 22122211444464462422222144442445444442444444444442444244444444446
4900: 01010201114411110000010111210212140414044444244402020400424441444
4940: 11140404444444444422124444444424242414444444444444441444444444444
4980: 04040402124412120001000010220212444424144444444441424040344442424
49C0: 44241404444424444442412244444444444244444444444443244444444
4A00: 21444444444444442424444444244444444244424444444244424444444444444
4A40: 44444444444444444444444444444444444444444444444444444444444444444
4A80: 44244444444444144424444444444444444444444442444444444444444
4AC0: 44444444444444444444444444444444444444444444444445444444444444
4B00: 12410224144241414410412214212244424244444444441442141444442444
4B40: 44444444444444444444444444444444444444444444444444444444444444
4B80: 44444442444244424440424244424444444424445444444424442424441444
4BC0: 44444444444444444444444444444444444444444444444444444444444444
4C00: 10000010102110100000111120411221120044124422444400024132141242
4C40: 30004032425472241040114224444444110244444444464122324254444445
4C80: 30002121412234400001121012112422224444444444440010441222224422
4CC0: 40005143635466611141214144446454213466444465764125454736455556
4D00: 00110010214410201011024412212442444244444444441213244444444444
4D40: 12440044444424242144132444444244444444244444444442414444444444
4D80: 12242444114244411242424224412444444444444444444444444422444444
4DC0: 44442422544454543224462244446526444444444444445244442444446667
4E00: 30102211041222100404444204224441112442444442444022344144444242
4E40: 60444644444645644444444444443144645744444454444524572444466
4E80: 40444242544444400444442044224424444424544441011444222222444
4EC0: 53444445344644424242444444546625555477622464766456454665655477
4F00: 40110013004431133242442430422442444444444444444425244424442444
4F40: 44441244444446444444444446424445444444255757546644444547
4F80: 42242444444443144442443424464444444444441444444424444446
4FC0: 54444424744474466244445544456565444455644474677675457775666667
5000: 32000000202210110110011224220410412242444444424122444444444444
5040: 00110001440011004400424241140424014444424440244042222441242
5080: 11211142114441450044214220444144444444444444444244444444444
50C0: 01220121244422440044004411441441442444444444450144044124444
5100: 23240011114400100221021112440043244424444444422222244442444
5140: 12440012444411210044002214410424241444444444442422244442445
5180: 22441444144112400441122124411224444444444444444444442444244
51C0: 24414444444244500440044104421644444444444441444442424446446
5200: 22422444214424444444442444444444444442444444445444442444444
5240: 44444442444444444444444444444444444444444444444444424442444
```

```
5280: 4444444444442444444444444444444444444444444444444444444444444444
52C0: 4444444444444444444444444444444444444444444444444444444444444444
5300: 1444144414440442144422440244024424444444444142432541422144442445
5340: 4444244444441444444414442444044444442444444440444444414422444O425
5380: 4444444442442444444444442444444444444444444444444444444424444444
53C0: 4444444444444444444444444444444444444444444424444444444444444445
5400: 0020000201041102010412042404441422222444444444421214444444444444
5440: 0041200010422241004401432044124412441233224444542442124644442444
5480: 2044214421444444414444444414444444444444444444444444444444444444
54C0: 0021002431444454004401441144434544424444444444441442444244444446
5500: 8122002110441020224200221244304244444444444444424444444444444444
5540: 0142213211442042024423540044334524444444444444451244332722442255
5580: 1244144421144124411442444004422444444444444444444444444444444444
55C0: 1242144401443245005433441355154744444444444444424444465644446757
5600: 1144444251422444424444444444444411442444424244444444444414444444
5640: 2444424412442444444444442144444444242466224422444455444424444444
5680: 4444444441444444444444442444444442444444244444414444444444444444
56C0: 4144444411444454444444442144444424444442244444454444444444445456
5700: 4144142252441114134442242024414444445444224444444424424451144244
5740: 3444324402442424422440356004505444464246514444044412274777104426O7
5780: 4444444514424444424444441044444444444444244444444444442444444444
57C0: 4244444402443444224444441244254644444444444465464444556244444667
5800: 1112111142424141114241214244424444442444444444444444444444444444
5840: 4444412144444444444424442444444442444444444444444444444444444444
5880: 2241421144445442112140414f454244444444444444444444444444444444444
58C0: 2441100444442444442424244444444444244444444444444424444454444445
5900: 1212110241424241112211124142414444242414444444444224444444444444
5940: 4444241244444444444414244144244444444244444444444444444444444444
5980: 4222000142440114122100001044001344444444444444444444444444444444
59C0: 4444111144444442424444224424444444444444444444444444442444444444
5A00: 4144444444444444444444444444444444444444444444444444444444444444
5A40: 4444444444444444444444444444444444444444444444444444444444444444
5A80: 4444444444444444444444444444444444444444444444444444444444444444
5AC0: 4444444444444444444444444144444444444444444444444444444444444444
5B00: 4444444444442444444444444444444444444444444444444444444444444444
5B40: 4444444444444444444444441444444444444444444444444444444444444444
5B80: 4444444444444444444444444444444444444444445444444444444444444444
5BC0: 4444444444444444444444444444444444444444444444444444444445444444
5C00: 1020211142422140211144242244444442144444444442241444444444444444
5C40: 1020003044444244414244244444444444424444444444444444444444444444
5C80: 2021212122424442414141414244444444444444444444444444444444444444
5CC0: 2020123042426456244442444411544442444444444445444444444444444446
5D00: 1012102121444040102120244044404444244444444444544224444444445544
5D40: 2224312444444414421441342424442424244444444444424444444444444445
5D80: 1144224251441114423444244133444124444444444445444444444444444446
5DC0: 4244122444446445134464464445674744442444444454544544465744466667
5E00: 4224444444444425444444444444444444444444444444444444444444444444
5E40: 4444444444444444444444444444444424444444444444444444444444444444
5E80: 4444444444444444444444444444444444442444444444444444444444444444
5EC0: 4244444444455444444444444444444444444444444444445444444445445
5F00: 7244244424444142244424444444444444444444444446445444444444445
5F40: 6444444444444456444444444444444444445444444445466254744444444
5F80: 6244444462444427244444444444444444444444444444444444454444
5FC0: 45445445744464444644464644456466444545454446556755644677644667T
6000: 3313101233003024000101021101130102042412214214011404141424426
```

```
6040: 01040221124222144044402422444422402040425244444560224023414441444
6080: 00000101021111130000000000000001020444424422442401122424242422215
60C0: 01011412114442460222122211442244501012434242444413121446344522567
6100: 22040101124201020100010100110102444414244444444441424140442241414
6140: 24441414444424444444412444444444444442444444444444442424444444445
6180: 04020202014201110101010100040101244444444444444444441414444442424
61C0: 24441424444424441114422244441424444444424444444444442422244444445
6200: 30221221110321000013042200210242224604450202043524361435033411146
6240: 12441424244414444444444444444442442045745444467246424660245245246
6280: 00120214001201120000010200110021142444442235444024244441324222254
62C0: 12241442024403142444244414442444122224544444245432444446224442574
6300: 32110412002101133414040301020003444604370422041246460235023303272
6340: 24440444244404444444424442444044444441414444404444447244515453567
6380: 02240424014401440101040200110114442144444444444442422143434261426
63C0: 24441444244404442444444024414541444414442441144424264426344436672
6400: 31122020012123100000111002122421211442424444441010244122424424242
6440: 20004043224625512442344424445442404415645442477142224552444234441
6480: 00001222004431240000010200100121444444444444444442122444444444444
64C0: 20113334434164560142424223422445202264654242444566324444452242446
6500: 22442422444424441142441444444444441344444444444444444444444444444
6540: 42442444444442444444454442444444444444444444444444454464444444464
6580: 14244444214422441412122410442442444444444444444444444444444444444
65C0: 44444444444444442424242444444445444444444445444444444444544445445
6600: 40222122001121210010144200412225405624571034246533452416002444258
6640: 41225356004464754244444622444345616666771466667724564677024646772
6680: 001214420042012500101241002000124244444442243465002444440224454441
66C0: 30244212304454650044224102454444204454774266667733555456344555674
6700: 42441231004214234322224500413446545421643245442667674446004614574
6740: 44444454244414254444224511443546645664772444447577775777114456774
6780: 02444424004414440022142400421245444444444444244444444444414424446
67C0: 12442444344454442244444433455656544546554446576555764565557776772
6800: 21000400221142120000040141212221241244144444444442412442444444444
6840: 44144424444444424244444444444444424444424444444444444444424444444
6880: 00000100101101120000000001011141144144444424444414244422442444441
68C0: 14112201424444444412441244444444442424444444444544424442444444425
6900: 04000400424000000100020011410100444424044444444444241403444444444
6940: 44244404444444444444244444444444444444444444444444444424244444444
6980: 01000400112101090000000000003444442444444444444222412444444444241
69C0: 4414240444444434442424124444424244424441244444444442424244444444
6A00: 22224444244444241242244441424444442444442442444444444444444444441
6A40: 44444444444444444444444444444444444444444444444444444444544444444
6A80: 14444441444241441112142440242442444444442544444424242424444444451
6AC0: 4444444444444444444444444444444444444444544466444544444444445544
6B00: 22221424114211421121041200421124442444444444444424442432444544421
6B40: 44444444444444444444444444444444444444444444444444444444444444444
6B80: 22442424114211440112041201241524244444424444444444424242445444426
6BC0: 44441444444424444444444444454444444444444442444444444444445445447
6C00: 300012112041112300002424214144442004444444444444221044444444444444
6C40: 4000423144446272444442444444444441044144444444442114444444444444
6C80: 30001000414042330000010110411124422044444444444420414454244444441
6CC0: 40004332622363572311223244442464612344464545755723432426444664671
6D00: 21112424214122422121442421414244444444444444444441244424444444441
6D40: 44442444444444442444244444444444444444444444444442444444444444441
6D80: 10012412104112240001121211452424444444444444444445444444444444441
6DC0: 242444344444452244242422454444446444444444444444445444445444447
```

```
6D00: 40114432202442130041442420444444442414452444444451325444424444444
6D40: 5324546242444546444244444144444462645477444464755556446744454456
6D80: 4023244430242156001124240042224541234444412544562343444523464546
6DC0: 6041644570447667414444444444442467155747771767477556755565547767
6E00: 5121244612421264341222230442244644454444444244666474424444444457
6E40: 4442444444445446444424454444454454454544444544477465557444445467
6E80: 4322442430241426323234222246262544244444444545446264444455574657
6EC0: 6444442564447447454425456546674774554456745464777756567677676767
7000: 5433202342123234021401131144121402032414442424242214142514440437
7040: 0011000012443213004401212444114401110226124412240224021604441246
7080: 1002010010113334011212020041140114144444442444504242444344442446
70C0: 0010011202444145001201421124214400111424104444672015326531441267
7100: 6525211353444134552501161446140544424244444444442647143644440537
7140: 1244021444442244244442444244444444444244444444452444425544444566
7180: 2142011221241021021112021212001244424444444444444444242444440425
71C0: 2444124444444124642414444444442425244444444444444453446442625454667
7200: 6544444423113214124244440144224414662457224427636274475014411245
7240: 2444144414445254444444442444444414245475024432552456224602441266
7280: 1144244401241442214444440144444424444444444444444242444441444445
72C0: 1144244402441454144444440444444402454424014434650454444601442257
7300: 7746344545442445774604462446026754671455444534556767225724562647
7340: 4444141424441152444424441444045424444663454326664471567044433677
7380: 2124244411441244012244340224044544444444444442424554423434452556
73C0: 1444344414441445244444240244154544444441444446544474447736454477
7400: 4013201013211022214142444244442424444444444444422414444444444444
7440: 0010303022424373444212444444244614224466424252441442444622445444
7480: 0041414400441345214442444042244444444444444444442444444444444444
74C0: 0010201322224257224444442144664620424424504254663144444622446665
7500: 3144222154444241214444244114444464444444444444444444444444444444
7540: 1244334412442444244434464244254544444465444454446464456574444656
7580: 2244124422440245114224440244024444444444444444444444444444444445
75C0: 1142224400442456414542464445474744444444444444455444445644455647
7600: 6234445620422223314444441042244251654475444544465444612444444
7640: 5122635621445257444444452444444561556677014266771656657712442676
7680: 2142444400441245114244442042444424444442244444424444442444444
76C0: 3022444420445567114244440044546304274772046767741244546234454667
7700: 7546124641454467654624452244354772664466344444466777625713454457
7740: 5244465622443666654247670344364774777477344456777776777745475777
7780: 1444244430442245234444442244224444444444444444444464464444455565626
77C0: 3244544432464667164544463346465755447476455675777677677765576777
7800: 2400121044414210242144224445444444444444444444442444444444444
7840: 4444242444444444444444444444444444442444444444444445444444445444
7880: 1010110041413301111121004144221144444444444444442424444444444424
78C0: 1440110144442461442442244444444424444454444444445444444444454446
7900: 1212120254420100244212124244141344244424444444442424244444444
7940: 4444242444444444444444444444444441444444444444444444444444444
7980: 0114010033221110121100030111100144444444444444442444244454
79C0: 2424111544441445442424242442464444444444444444445442644454546
7A00: 4444442444444444444444444444444444444444444444444444444444
7A40: 4444444444444444444444444444444444444444454444444444444444
7A80: 4244444444444424444444444444444444444444444444444444444454445
7AC0: 4444444244444444444444444444444444454444444544444444444444
7B00: 6424244442444444464524444444244444444444444444446444444454444
7B40: 4444444244444444444444444444444444444444444444444444444444
7B80: 4444442424441244444342461444546444444444444445452444444464446
```

```
7BC0: 44442454444454464444244444446444444245444445455665544474444 5546
7C00: 4101112222425133222214444424444444422442444444444442244444444 44444
7C40: 2520444344446244444444444444444444444222244244444445224444444 44445
7C80: 4110101142435233404141454344444544424444444424444444444442444 44446
7CC0: 3000302240415341244222446444545444123445544454456254645575445 5567
7D00: 3412241244441141442444444244442444444444444444444422444444441 546
7D40: 4422442444444444444244464444244442444444444444444444444644444 444
7D80: 4211122452441425332424243345255644444444444444444444444464446
7DC0: 2122142644443475645262567466746444544464444442656465457554646 47
7E00: 63445444424444445444444442444445443644444444444445444444444446
7E40: 5344745444447464444444444444444626564774444547624654456444 44444
7E80: 6244444540444467234444444145444645444445454544554546444445 45446
7EC0: 7044646573247677444444462444547715574777636676777647546766 466777
7F00: 664654656445646766455426564445476555446644445466 7656446745465467
7F40: 6445745655446456444646564444446645474664454656677 67776674445 5677
7F80: 6326454453453467574622464445746756444444455444657674747566 72647
7FC0: 76427467764574776746474777477747747764677667747 77767776777777 77
8000: 8424223432233345242501151214034500020212000201030202010400 0030115
8040: 001111010124325301141125244424460000050200121123010 1050422221235
8080: 3211142443334456011414451224112501024424031424150002441401021447
80C0: 0122142232442760124222412442244701031424021424562204 0416342 64667
8100: 2201020110110202341501013223210402010200010404021204 0000213 050114
8140: 0424040414440414144411442441424040404010244021402040002224 43124
8180: 0224144402240214014141402241416142444442424242401242404311 41426
81C0: 2444242424441412224444241444244444242424244424440425343524 244436
8200: 0001041400000000111424440040440001040200010001 0001040400020051
8240: 3444242401440244444444444444240100041400440011000 1123301420031
8280: 044444400240424244444410444440414242401122424022 4444411242444
82C0: 244444441244344444444444444444412444444124412241444444432445444
8300: 1111041100100002012504441344024105050400010204020204 0102000 10002
8340: 2444142414440442442444444244404120401021401011433010 104240203
8380: 1444444401440442242442441144144424444444122414141444 44441 2251214
83C0: 24442444544404444444444444442444444444442442241 24354424444 4544465
8400: 0000111100401321004244441044444400004221002112240020 2422 10414244
8440: 8011012210421242214441414242440000010200411111010 2022204 22241
8480: 22444444214444442242442444414444444421444444442444 4441 444444 44444
84C0: 15444444412244442444444424444442141444421414242244 4445454 44456
8500: 1144242224441241114422442244444242244442444 44444421224 22144 44444
8540: 2444124444442242144104442444444244412224424442440430010524 42254
8580: 44444444444444441444444424444444444444 4444444444444 4444444444
85C0: 444424444444444444444444444444444444 44444444444444454 4444 44454 54
8600: 8021242100411111114444440044424400102440002104410 10444 300412222
8640: 1144224400441244444444414444440000121000200012 01221231 0422124
8680: 4444444410444444441444410442444444444424444444444 441424444
86C0: 1442444104422244444444424444444222444410422402244444441444445
8700: 0141121020410002241444422422420012012000242110002222 21001422413
8740: 2244242222443422444422445244424411221440112440200102301 1441442215
8780: 4444444422444444444444442444444444444444 44445444 4444 44 44444
87C0: 4444444444446444444444442444444444424444444545 464444 44462446447
8800: 54111101431243243402140201342440000040000013411100014 0101132224
8840: 010482002444342612442222444444501000400122202130101150324 444247
8880: 5411241465247657230314133415274701004414112224140304241202 042446
88C0: 4100424463467677214115151446476702022434024534573424463 565466767
8900: 21000200100000103304010102111214020004000141414122302020012 144202
8940: 0414040444441414424410102444445040010402144441414020311 0244441236
```

```
8980: 3101041431003123230311004243425141444441412441401142406043544437
89C0: 1244041444443414124423134444674714122404442424353715442456256577
8A00: 0102244400002400124444442244444201022424010114420100444411144444
8A40: 4444444444444444444444444444442441422224442444242444444444444445
8A80: 0414444410004444224444441144444401014444012144420114444402134444
8AC0: 4444444424444444444444444444441425444414222455454544444264444.5
8B00: 0101042300000100212422443042244412011411140124242214223312442445
8B40: 4444244444442444444444444444444424024444441424444414444444444444
8B80: 0212444400001222124444440241244614144444040114142226244413375267
8BC0: 4444244444442444444424444444444424442424442444464264245555665477
8C00: 4200121032211422201024442124444400024001112242201004421511224442
8C40: 3020034242424465114140404444424410112132114211443422403342454247
8C80: 6210444463216564432144444344444421104442442444451521444444444546
8CC0: 6220646463237677424154444545664752325477412462776545776776477667
8D00: 2011111110411140232241441242214414012410444444241501440042444444
8D40: 1224212244442244414411444244424514002200444424444303213342424256
8D80: 4142444411414442414242444344444444444444444444445454444444421445
8DC0: 3444444444446245524444466445465624244412444464456546566775466677
8E00: 3112442101212221214144442244444420004401142243342244214142442.52
8E40: 4041244524444442444444444444444443021224210424261444544544545647
8E80: 1224444401224442224444444144444410004444112354645343444443442446
8EC0: 5442444441145445444444444444444460326476522165756677657765476767
8F00: 4222313332103203644242422324544522024420344444156513443342463456
8F40: 4444322244444522545254442444446323044324244441666545425666466667
8F80: 6444444614224455744444453444645244444444424444475264444575655567
8FC0: 6544344574456445744444457446446654446456644464777777777777577677
9000: 3212103220022223231411230223114000001130001013302030405012212.25
9040: 0000001300110133004410444244414200000100001000010102020101421122
9080: 2011224321143340011112402111145041444402014442001214120012.4446
90C0: 0001020221423255001411140044222600010402112122120204022421244447
9100: 3303022122110003454502042344031401010401011214040315021433250425
9140: 0000400201440112004402412144214200000400001201010151020221442103
9180: 0214221421142114012511122324333514244414241444240114140402123427
91C0: 0144021212240212004410122044134512140402221414020144040631242437
9200: 0124142400420121244444441144444400220222000100211222444410421244
9240: 0144144004402444444444444444444400010204002100114442142421441244
9280: 4444444401444444444444444444444444444412124424444444444444444444
92C0: 2444444412441244444444444444442244444441024142424444444444444454
9300: 3224014014101215346142433421242111202310011012123351424012201.03
9340: 0242042402440224444444444442444000000102001200011310103114.40131
9380: 2444444412441442444444442144444444444444141424044445444425462445
93C0: 2444144414404424444444424444444442444441222342534444445244.45565
9400: 0010242210414241404444444144444400104441042444421411444442.424444
9440: 0000202200202121414441424244240000002010020114121414242204.44444
9480: 2144444414444444444444444444444444444444444444444444444444444444
94C0: 1141244420422244444444444444444421144244142244424444444544444444
9500: 1344124442442142124441424144414412424444444444442444444444444444
9540: 1142002422441144114400222144014404221141244012441220013212.20042
9580: 2444444444444444444444442444444444444444444444444444444444444444
95C0: 4244444444442444244442444444444444444444444444444444442444.4445
9600: 1042444200422221424444442044444400204452002012214142244420444422
9640: 0041225200420021444444442444444000101241002000010204244442044.2242
9680: 4244444420444444444444414444444444424444444444444444444444.444444
96C0: 4244444210442442444444444444442242444400422442424444444421444444
9700: 1224224421421101424444442144444411223422114401001141245441442442
```

```
9740: 124434420044121144442244214411440021022200220000122400151042003S
9780: 4444444424444444444444441444444444444444444444444444444444444444
97C0: 2244444422444444444444442244442444444444524442546444444461446466
9800: 3200012032203113022211112121444000004010101442201004211122244Z2
9840: 0001010011441214124421124444444400000100004102011201110022444422
9880: 4200440153235440213221313135425020244440121441202114414000S4425
98C0: 0300121232455450013110212444247020254001121142303024203114444é7
9900: 3212100022002000340422022313111301000401041414043314140211264234
9940: 0001010014440141144000242444242000002000124040101010002214421 13
9980: 3221014321432334040001450444151404440412024422032544112335Sé36
99C0: 3114120Z3142462402452313334555160202040111011423033734243445754é
9A00: 1412444432214441244444444444444412014424120124444442444424444444
9A40: 1444444424442444444444444444444401102422421124444444444444444444
9A80: 2444444411114424444444442444444412004424110144242244444444244444
9AC0: 244444441144444444444444444444442002214110022324244444444444445
9B00: 22214444101011124444444412414244121124341411241445452442544444s
9B40: 144404444444444444444444444444440211042414120202244322454444424S
9B80: 34444444200031444454444432326261414444424324444464474454374754 7S
9BC0: 244424224444444244444444444445462222243532224436644464456764776ZZ
9C00: 30002412214141412144442444442000044222422444211044444444444442
9C40: 10001132102121114142414044444440000010000100221414322424244424S
9C80: 53114424334262424244444414444444442444444444444442444444444444
9CC0: 2010322031415243424244445445645110034031111143132454446444544sS
9D00: 2111214120414042324340440411044114044444444444442424442244444424
9D40: 11221131244411441244134444444244010011202442124223242233224422Sé
9D80: 41444444242414444424242434653464444444444444444444444444444S4446
9DC0: 4224444455445445634544574744774524244444442234556747445746466767
9E00: 1221244021214241444444442444444410314441204244212244444422444444
9E40: 1140242011412420444444444444444400002220002C1220454244454244s444
9E80: 4244444421444444444444444414444444442214444412144444244444442424444
9EC0: 14224454114411424444444444444444411002413200042556464444641444446
9F00: 5413124141213113654644454142444725324421244442426566644464446444S
9F40: 22423422544424164244564444444246314141443114212355552455214465Zz
9F80: 6444444414462577644444464464674454444424624446554545545644746S7
9FC0: 544464446644466655544445556565747522654565145545477777767775677777
A000: 3201020100002011114244411111425010014010400140102022424141224 14
A040: 042414224444244444444444444444404022414444444441244444444444445
A080: 020214141200121102244444001144240401444402014424010444440101444
A0C0: 14442444244444442444444444444444402014424224442201044444124444 4S
A100: 1414141412112211244544114242414124444442441144114241444044412140
A140: 44444442444444444444444444444424444444414444442444444444441144
A180: 1444442412422412144424441102151444444444444424244444444444242424
A1C0: 44444444444444444444444444444444444444444444444444444444424444 sS
A200: 0101242200000100222444401144444012244040002120103042425010414 44
A240: 2444244424442444444444444444444121444352224434444444444444442444
A280: 1244444400011422444444441444444020144440012443401044444011344 4S
A2C0: 44442444144414444444444444442412444444424246412244444444444446
A300: 14222244021102102224242402141212140424340402040424162435022402Qé
A340: 4444244444441444444444444444444442444444444444442444444444445
A380: 24444441244142444444441214141444444441144424242444444444254444
A3C0: 2444444424441444444444444444444444444444444444444444444444446
A400: 22224444214424444244444444444442444444444444444444444444444444
A440: 4444444424444444444444444444444444444444444444444444444444444
A480: 4244444444444444444444444444444444444444444444444444444444444
A4C0: 4444544442444444444444444444424244444444444444444444444444444
```

```
A500: 4444444444444444444444444444444444444444444444444444444444444444
A540: 4444444444444444444444444444444444444444444444444444444444444444
A580: 4444444444444444444444444444444444444444444444444444444444444444
A5C0: 4444444444444444444444444444444444444444444444444444444444444444
A600: 1542444411444422444444444414444444214244444422444444144444511444444
A640: 1444444442442244442444444424444444422244642242446422444444424444444
A680: 4444111424444444444444442444444424444441414444444244444441444444
A6C0: 4444444441444444444444444444444454444414244544454454445444444446
A700: 4444244424444442444444444444444444444444434444444445444424454444
A740: 4444444444444444444444442444444444442444441444444444444444444444
A780: 5444444444444444444444444444444444444444444444444444444444444444
A7C0: 4444444444444444444444444444444444444444444444444445444444445445
A800: 2100241131004410241144422141444414014412240144212412444444444445
A840: 24244444444444444444444444444444442444444444444444444444444
A880: 0100241422201413011144220211442202014444010044220102444400014446
A8C0: 2424244424242244424244444444444422442424244445124644244444446
A900: 1414140421122221440024012201241444244414444444244414441244144414
A940: 4424241444444444444444444444444424144444444444444444444444444444
A980: 1414241411112224110024012000140344124424444444424444424422444444
A9C0: 4444244444444444444444444444444444444444444444444444444444444424
AA00: 8101242210002410121144442142444401224434111024221013444421422445
AA40: 4444444444444444444444444244444444444445444444444444444444
AA80: 2103442422002422102244441042444400234454203344450131554403354547
AAC0: 2444444444444444444444444444123244252232447545464445264744467
AB00: 1214142401002410152144441121442424342424241144444416442424244445
AB40: 4444244444454444444444444524442424144444444254445444444444
AB80: 1424242400001444234444423321444424144444123242414664444344744567
ABC0: 4444244444452444444444444446444424444444445444644456546664677
AC00: 1110444444444424442444442444444442144444444444444444441444444444
AC40: 2441442444444444444444444444444442044444444444444424444444444444
AC80: 1020444442244444424444444444444421044441444444444444444444444
ACC0: 3112542424444425424444444444444421044424444442544444444444445
AD00: 4444444244444444444444444444444444444444444444444444444444444444
AD40: 4444444444444444544444444444444444444444444444444444444444444444
AD80: 4444444444444444444444444444444444444444444444444444444444444444
ADC0: 4444444444444444444444444444444444444444444444444444445444444
AE00: 4511442412411442145424444414444443024444422444444043444422444444
AE40: 4244444444454244442444444444444411206644444445444464445444444
AE80: 3021444422444244144444442044444420004454203545564214244442454446
AEC0: 4122444421444454444444442444444411422476207674776244445644564467
AF00: 7424444224144226644444442244444264444441444444447564444454444454
AF40: 4444444444444444444444444444444444444444444454655644554445446
AF80: 2424444444444447444444442444444454444444464444444645444464664446
AFC0: 6444444444454454444444444454542464444454647474746546756466677
B000: 4312020232022123332424241111142403012431020024021402241401121412
B040: 0010011101441221244444444444444401111212124414251224242512441446
B080: 1200121100031130011420020211213020144440100442101014424000012412
B0C0: 0011121114432460144441411444244000114441111444412134425011225446
B100: 4411021443112133562514163445143524142414444443415472426424624247
B140: 0444041444441442444444444424242414124444242424441414244404445
B180: 1244241531121201112412141313011444442424442444424244424242112444
B1C0: 1444141424441224224421421442446444424444444424345244442444446
B200: 3212241421001220444444442442440234242411212231142644242412414244
B240: 1244544412441244444444444444123424441044122444445424442244
B280: 2444444111124214444444444444422124424110144424244444411124444
```

```
B2C0: 1444244422442444444444444444444444444444224424662444444444444444
B300: 4224142432220213764712445526124524462444224414245667443612470237
B340: 3444042412440444444444444444424412541444144434552444246524542565
B380: 4444444432421224444444446442446444444444254444224544554446244
B3C0: 1444144424441444444444444444444445244444442444246464464446664464
B400: 2141442411444424444444444444444424444444444444444444444444444
B440: 1010224220414241444444444444444424414444424444444442444444444444
B480: 4444444444444444444444444444444444444444444444444444444444444444
B4C0: 244244442144444444444444444444444414144444142444444444444444445
B500: 4444444444444444444444444444444444444444444444444444444444444444
B540: 4424444444444444444444444444444444444444444444414445444444444
B580: 4444444444444444444444444444444444444444444444444444444444444444
B5C0: 4444444444444444444444444444444444444444444444444444444444444445
B600: 4142444420444424424444442444444421454444414444244144444442444444
B640: 1042444210442224441444444444441041446200215261424444444244444
B680: 4244444421144444444444444444443444444441444444444444444244444
B6C0: 414444442042542444444442444444424444442042446444444444424444454
B700: 2444444422442444444444444444424441454244444442256445444444445
B740: 2244164442444442244444444244441442444546424442464454554471244566
B780: 4444444444444444444444444444444444444444444444444444444444454445
B7C0: 4444444454446444444444424444444454444445444446455444614456454545
B800: 4302441131002421422442444224441424014424411444224444444424444
B840: 3411244444424224444444444444441222442444444442442244444444444
B880: 2110441143004443122444412011344440401444401022441111442400034444
B8C0: 1210220312244224242244141244544444421444424444455244644452444456
B900: 4134140141114243572424424423442444412441444444424442444144444444
B940: 1422240444424444444444444444441414140244444444424242444444446
B980: 4421151453133102342124014403140544244444442444424142444441314555
B9C0: 1444141444443445444444554645665624444425444424254646446146446477
BA00: 1414442441104410444444444444424334154222144444424544444454444
BA40: 2244444441444444444444444344441244244344444244444545444444444445
BA80: 2444444421042424444444442244444424014444113344572222444412244425
BAC0: 2424442244422444444444444444421254454315624544464455424544447
BB00: 4414444422112213674444444424244454544444432224646667446556564456
BB40: 2444144444444444444444444444141444244424444454444544426444456
BB80: 4444444431344445746444455444647445444453454447466574446777756777
BBC0: 1444244444444454444444625445465244442465254746664654777677777
BC00: 3110444424444442424244444444444422444444444444444444444444444
BC40: 0010441222442421444444444444422404444444244442444446444444
BC80: 211144446444545424444444241444444441444444444444444444544454
BCC0: 1010423131417263444444444444466441044444425445414544455444546
BD00: 412244214444444444424444444444444444444444445444444444444444
BD40: 2144442444444444444545444444444445444444444444664456444444
BD80: 2444444644454444444445454544444444444444444444444444444444
BDC0: 4222444554446554244454654445646442444441444465546446766455466
BE00: 4221444412124224244444444444424244444444442524444442444444
BE40: 1021444212422224444444444444414546622426454646444644444
BE80: 6144444514445442444441444444425144442026446622424444424444444
BEC0: 4244445541427566444444442444446213446610657477565644474545466
BF00: 7624454644255247744444544444456454444444456566564445444457
BF40: 4444424444442444444445444444445444545544446465774644774444676
BF80: 7444445644454645544445544445764544444475446646664444767444467
BFC0: 5444546575446446644446466455757644554767465757776676477677
C000: 5434213332023234110200040022120400100223000101330000002000000014
C040: 0112012114242224402440124124424444010112221244124502000114014211145
```

```
C080: 2124144443424157001114000224342414244444242444440112241401221224
C0C0: 8112121514444467011114211444144401102444244254662213341633455467
C100: 1114020101111022010200012011000204140402044204140001000001110102
C140: 2444042244441444444442344444444442044114224444242424441133244433444
C180: 2444142444441424114204011124014244444444444441244141224441414
C1C0: 2444144444444442244244421444444444424444444444443444242454444465
C200: 0112044200120011044414440144014401010402001200010001010300010001
C240: 4444444414441444444444443444444424244442401440224414244441104411143
C280: 2444444434441444244424441144224444444444122414441444444422421424
C2C0: 4444444422442444444444444444444424442444424441444444442542454454
C300: 8222041001210100002204100012000204150411011102000003020200000002
C340: 4444244444404444444444444444444424442444424440422224402142244442445
C380: 4444244424442444444411444444400442444444444424142444442444244410224
C3C0: 4444244444441444444444444444444444442444444424444444244534444426
C400: 4220202330212132001011220041114300011411500211424000001010100424
C440: 3121426412445465124122422144134620342265102225560022021331443266
C480: 1144444431424444104244441042224444444444244444521444444424444444
C4C0: 4545746642427677114224442144244430406447425264663243445642445456
C500: 1224114124441240104411441244414424442444444444440021100022444422
C540: 4444314224441244214433424044415444444444444444444021203341442146
C580: 4444444444444424444442444444244444444444444444444444444444444444
C5C0: 4444444444444424444444444445454444444444444444444444444444444445
C600: 3011124110411112201124440042224410341443004101231122000300430024
C640: 4044442511442242414444454044424430444326600453155214530450042155
C680: 2444444400442444414444441044444444444442242444420424444440444446
C6C0: 4244444410444444442444421444444414444654146547720464456411464446
C700: 0340211111411113424022443240314421402221012211223233003300422033
C740: 2444322524443456454422442044224422444442224444424254325620454355
C780: 4444445444444454244444441244244544444444444444444444444444465456
C7C0: 4444444444444444444444442442445644444454445444644544556645557777
C800: 6522341344134445220101010221141302000201041214140000002010111122123
C840: 1414143144444426242121204444444524011401444424451100421244444446
C880: 6522150375146557240110013423242614244424444244444402112411131424444
C8C0: 3522344566456767724102111444564561110442444444467322244132645657
C900: 3401040111413121130101001310041002021404444424440101040001412021414
C940: 2444040244442444444422204444244424143404244444424444224412444442445
C980: 2442141225442412131200013411111244444442444444442414442414224411445
C9C0: 4444141444442424244414224544564544442424444442444445242544445566
CA00: 1424244424444444142144442424444424112444244414240100144212241442
CA40: 4444444444444444444444444144444444444444444444444442244144444444
CA80: 4444444424442444244444444444444442444444444444444444444414441424
CAC0: 4444444444444444444444444444444445444442445444444444445465
CB00: 1421042214421422312002201322124214423424244441444011204121242042422
CB40: 4444444444444444444444444444444442144444444242442444544445446
CB80: 4444244424442444244424445451424444444444444114542444144455452454
CBC0: 4444444444444444444444444444454444424442444254644444425444466
CC00: 5220324443434244200012211041424400001401311224140000040100111424
CC40: 5131546422447676204043424244454530324455224544572232435464464456
CC80: 7421644275246776322124413423244442114444444244461131442524244426
CCC0: 7413666575477777142256436546776752336577514766774354767765566667
CD00: 3212242222441141442122422142414411404442444444440101241124444445
CD40: 5444242644442444444421444444524614124444444444442314423444442264
CD80: 4424244444456446444442265465445444444444444154445444454445
CDC0: 4444442465447556464466464745775744444444444446556465567455457777
CE00: 5120544422445443314044442144424430221423112212243232121413422427
```

```
CE40: 61425445224464644244445444444544726544672254546765566667752465657
CE80: 54444444431444444413424444421422444434144442242446434444254447264
CEC0: 73446474614564754444454446344444573546477647775777577766765676677
CF00: 54432421444253556442264442444647444434442544444455554443445464566
CF40: 54446446444454574554465554444646446675544444444667675476665555677
CF80: 65444444464456675545454446746565745444444444454466646445557474667
CFC0: 64445465744466776644664466457557744555766444667777776667776777777
D000: 43021002322122231213001120210013000114120112041101131414012214426
D040: 00220030324410120044004221441041011114121224142501140144014411444
D080: 31212122314441144004112010022112324444444444444401444414114244444
D0C0: 10210111414422420042002110441142112124242244445610421124214532564
D100: 43420012314420112444101413440013342214242444144211242120222220434
D140: 24440124444411142004200444414412441444242424442244424244544441445
D180: 44442224244442441044211421444324444444444444444442145241442442444
D1C0: 24442444441442244410441024104413442424444444424442245444544446456
D200: 24444424114414424444444444444441122414444002201212244444441442444
D240: 44444444424144144444444444444444424444441244144144444444411441244
D280: 44444444444414444444444444444444444444444444444444444444444444444
D2C0: 44444444444444444444444444444444444444444444424444444444444444445
D300: 34441444124404422645144514441442024214120244042113471436012201113
D340: 44442444244144444444444444444442444444424440242444514444444440245
D380: 44444444244424444444444222444444444444444444444444444444444444446
D3C0: 44444444444444444444454544444444444444424444446445444444444455456
D400: 32211012214220402142414241444141115144422244444412224444424444444
D440: 01223232142414121441024214421421141344220222444424244464244444446
D480: 44424444424441444444444444444444444444444444444444444444444444444
D4C0: 12412222414464444144414442144424444222445444442444424444444444444
D500: 14441121414440402244404441424244244444424444444422422444442442424
D540: 22443254442443144214400345414413472442434444424444235215562144264
D580: 44444444444444442444444424444444444444444444444444444444444444444
D5C0: 44444444244455442144224222442445444444444444445445444444544244655
D600: 42444442104424444244444442144444411424442002242242454442104442444
D640: 24444442114454444444444441444444104542660042112142444446204442444
D680: 44444442244444444444444444444444444444444444444444444444442444444
D6C0: 44444442124444444444444424444444444444422444443444444454244444444
D700: 44422242214411426544444511444444411422402421222444744562145425644
D740: 44444441424442424445246204416464256446612441265614711667204435674
D780: 44444442244444444444442144444444444444444444444444444444444244444
D7C0: 54444442244444442444444422442424444444446444644544454466544465766
D800: 44021113432111431321411021424251040144144444441411211441244424444
D840: 24241413444444444444244222444444142412441244444443444424444244444
D880: 53112413644455651110211113213434244444444442444422224414214444446
D8C0: 14224422524476672222412441444244221044144444444534244444424454464
D900: 44143104114241134513211043511342142224044444244414134414444444445
D940: 44141412444124444444224244444444114141404444443242442422444444455
D980: 54242242744413243421200044441315444444444444444444645546464645566
D9C0: 44442414444444441145214543454446424242144444446444644676644644774
DA00: 44444444444444444444444444444444444424444444444444444444444444444
DA40: 44444444444444444444444444444444444444444444444444444444444444444
DA80: 44444444444444444444444444444444444444444444444444444444444444444
DAC0: 44444444444444444444444444444444444444454444444444444444444444445
DB00: 44442424444424442645444444444442444442444444444445462445244424554
DB40: 44444444444444444444444444444454444444444444444424464444444444444
DB80: 44244444444444444445454544444444445444544545444442456446644444444
DBC0: 44444445444444444444444444444444444454444464456454466656446576...
```

```
DC00:  4310222122424243434144424242424431004424424444441211414144144444
DC40:  2221444242446444444442444444454411135444524444445224424446444444444
DC80:  7511424465227645444241444464444464444444442444444444444444444445
DCC0:  5140643362427767244245424445656222245664445445566464444446446467
DD00:  4242114142424143444441144343442414444444444444441424444544444444
DD40:  5442534644414241434155474444145412244445444444442427456642444456
DD80:  6444444472444244544444475466474444444444444444424544446454444465
DDC0:  6544656566447656674557476746776744465425444445666647667747575777
DE00:  2242444442444444444444444444444422644444244444421546444444444444
DE40:  2244445444444444444444444444444422524466444444454464455444444445
DE80:  4444444444444444444444444444444424444444442444444424444444444444
DEC0:  2444545424446454544414444444545445544465244547464545444445644555
DF00:  7645245264454244764544464444454444444422444444445756446445444456
DF40:  6445544644447444564445746444445445456445644444455675474677444555567
DF80:  7144444474444455544444555445457444444411444414546464544456674567
DFC0:  6444544564456457664466466744774774464477744464767767667767467777
F000:  5423312342023234110301030013210401031401020214030004141402110425
F040:  0422021224443444144412444444444501011422122214640114142600441447
F080:  0101141121124434001140010242121020144240411441401021244011124124
F0C0:  2110142324441157032224444444444600012414242244662331146501225457
F100:  2414041144220100141314000113010144244244444444441412440644140411
F140:  4444444444444444444144444444444444444424444444444444444424444454
F180:  2444242444441524142214011112140144444444444444444442424442444444
F1C0:  4444244444444444244424442444444444554444444444454444444444444546
F200:  4121121203003102004144440013144502341437020302030224121502020237
F240:  4444444424442444444444444444444414452464242226425454442600442246
F280:  2442444412241444242444410224444412444444424244622464444214644446
F2C0:  2444444424441444444444442444444412454444442442464324644461246465
F300:  4215042312111223441514131202031324462444544204343435042400030124
F340:  4444242444444244444444444444422244444424242244244444444245514443556
F380:  2444244422441444444444400314145544444444444444424244444444452564
F3C0:  4444244444442444444444442444446444424445444244525454456545556577
F400:  6243414153424144102142441144444221154445444244441021444542444444
F440:  1222645742446476244444444444441053247542424455004344262144455445
F480:  1042444421422444204444441144444442444444444444441044444444444444
F4C0:  3041247461427455214424444444445202154464222646600424445514254657
F500:  4444442444444442444444442444444244444444444444442444444444444444
F540:  4444444444444444444444444444444444444444444444454444444444444454
F580:  4444444444444444444444444444444444444444444444444444444444444444
F5C0:  4444444444444444444444444454444444444444444444454444444444444444
F600:  6242345220424263204144441042445526524651132246732452446004552447
F640:  5444657414445455424444442444444606654771166527732774477004626677
F680:  3142444410444242124444441044222444244444444455104444441045522446
F6C0:  4144644442454642244444444444411625477625664764244244461356456567
F700:  6454444432444444644444462044445754774456344444477674267034644557
F740:  4444344444446444444454554444556465647724445476767755677134656577
F780:  5444444442444524444443144454644444444444444442444444444454467
F7C0:  4444444444454464444444455446546244464544445464765644676647767777
F800:  6524241353115434220142121110242114024414242244442411444444422446
F840:  4424442444444444444444442444444444424444444452444444444444444445
F880:  510124105414566501101110122201222244444444224444444424442244444445
F8C0:  2410443364457467442044224444445244444564425446324444426455466567
F900:  1510140024212220030112011311420044244424444444442411241444144455
F940:  4444242444444444444444444444444444414444444444444444444444444444
F980:  2411441142242423100111002100113144444444444444444424424424442446
```

```
F9C0: 4444242444444444444422544444444444444444444444442444455566
EA00: 3524442414224411221044442222444511324444223444441022144510242446
EA40: 4444444444444444444444444444444444454464444444564444444444444445
EA80: 2444444441124444461020444412422444243444442454465444444414275567
EAC0: 4444444444444444444444444444444454544455646664476544545444464567
EB00: 3421141444412421451111422222414454444242444442444241324251444246
EB40: 4444444444444444444444444444444444244444444444444444444244445466
EB80: 4444242424444443322242533454546444444444422464562644246767565
EBC0: 4444244444524464444444444444646444444444444446455544454654666677
EC00: 7432444754464552121244411424444421144154444444211314444444444445
EC40: 5413655544447455444244454444444434345662442446641444446444444445
EC80: 7200444674426667004022341242424454120444444444452041442442454445
ECC0: 62226554742676772342542544455546601344467445674774344444746447577
ED00: 6424244442444444421414224444444444444444444444444425445444444446
ED40: 444444111444444444444444444444445444444444444444444425445544444445
ED80: 412244416444544446344424114544464444444444444444424144444464444
EDC0: 44444444444465444444424445444564644444444444444464455444644555476
EE00: 7414444651246567132244440424445524345622664466335444462246464647
EE40: 7344646624446464144444444444441737574774446747754774577554544667
EE80: 6223444524564572242444432424444604346453762477134444456346567
EEC0: 7164745573247577644545424546664674664774775777777666675777577777
EF00: 665644666444655765432446335465476576445545445466777744676644257
EF40: 6445466544454667444654454444546647655664445446677677667464447777
EF80: 65544424664554675425444474276466444445444646466747444477776777
EFC0: 74455466654466775542664476467777475746764667577777677677777777
F000: 6534314453134345241500242313210411021404010012232204123521030235
F040: 1011000211422043004400411144002301020413114424372113013701243247
F080: 2202112043015344201111000131303010044420100441300014424020332414
F0C0: 22100033212243550042002102441342003123411123477335524733245477
F100: 7627313454544344574723254425231524244444444451144614371222252236
F140: 4444122444443126444442246244444264444145244444454424414672444475
F180: 1444221444443114132224034344402054444444424444552246444444442456
F1C0: 244414444244446224444444444444744454445444444564547246757257477
F200: 6314444331231334646444424444245026544561111113445462425214440145
F240: 2444444444444444444444444444441442455114432762226424660044247
F280: 2444444412124446244442444445244444442124444624444444441444444
F2C0: 4444444424444425444454444444422264454312426732474466545467
F300: 76473467555424655776714474547241634672465144417557673577236725473
F340: 4444244444444454444444444242464444454224444476554564773245367
F380: 224424444254346644444444424444556444444444454246445464124555625677
F3C0: 4444244422444454444444464444546544444446244174777567457765476677
F400: 6343114333414243214441444244246244444444444444244444244444445
F440: 014161532141516422144244444444461143445741422456234424562142624
F480: 424444446442644522444444444444454444444444444444444444444544444
F4C0: 422044245141645524444444444442022646420424467354544662644567
F500: 65444444624441536444424442444464445484444444444446444544444446
F540: 44442446444462464244454444574754244455444444466446446744444657
F580: 4444444544454454444444452444444444444444444444444444444544444
F5C0: 44444444444544424444445444645745444444444446464444446667446467
F600: 6345446431455547234544454144444417644751144444624474446114522246
F640: 4144747411446456444445464444456526564772041517521474457004445467
F680: 244444443144545444444441444444445545446644444444442444445
F6C0: 21424444414275664444444442444452044445610457477765654466545567
F700: 766624665256547777474556434545456276466144434677767457731555567
F740: 544464441444665745444566424465476576476424454777667777754665777
F780: 44444447244645625444444463465546444444444545442545444445466466
F7C0: 444454457546465754444544664446577444646474447576777477776677777
```

```
F800:  75342534641374441423441144214444441344224421444624144444442444446
F840:  24442445444444454244444544444445441444554444442444444445444445456
F880:  54224221743375551420240033422435422444424424446624444444424444447
F8C0:  11124233424265762442444524446464214446724444475452742675744757 7
F900:  65242411554343135726121265442415442444144444444454444244544464456
F940:  44442411111144454444442444444444444141424444444444424545444445466
F980:  56122411752464256522233155352515444444421444444444444544466647446 7
F9C0:  44244445444446564644444644457674455245644444446656764565747776 7
FA00:  66444445524144434545444134444454412644444442436641454444444444
FA40:  44444444444454444444444444444444445444245444444456444444454444444
FA80:  644444442244464544444424444444454444245741572546144544444447
FAC0:  44444441114464564444544444444464444465444664776646444646446467
FB00:  67642156764244467562445674444464464245544544463675744664546464 7
FB40:  4444144444444444144444454444444445424444464654654644445647 6
FB80:  744444446564465767454444764656674465445544754477556744667577466 7
FBC0:  4444244664465554445464654155464454466646464777667647777677777
FC00:  7534416565467275212546221444454124444444444445422444542444441
FC40:  31216167444474554442454644444442244445742444446424744474444446 7
FC80:  74126441754477764244444544454446444424444444443464445444644444465
FCC0:  52326674735377774542452755456647536344775246557776466477555677 77
FD00:  67246454764442647644446454546444744444444444444462644454445446 5
FD40:  4424655644444454444467574444555744265446444444454645466744445467
FD80:  66245444774464566745444676465647444444444344445445454444466554 66
FDC0:  64445464754676675744676665467767245664674444556677676676747777 7
FE00:  75656547622466674746444454244444651664445444644447456444545444457
FE40:  6163716624446467454444454444454446456477524474677764467444544 46
FE80:  744444547355756526454444534546464446464525544675644444546564447
FEC0:  73456576715575772446444655445646757564776577767777766777477677
FF00:  777757777567677767565767565667666644774464455776765775567667 7
FF40:  64446675644564777545775745455747756666775464647777777777655767 7
FF80:  76556556776676777464446774767677475445545577557777744767777667 7
FFC0:  75666677755677777467777746776777775777676757777777777777777 --
```

What is claimed is:

1. An image information signal processing apparatus used in an image display system including image information input means for obtaining an image information input means for obtaining an image information signal including an input image by optically scanning the input image, and image information output means responsive to the image information signal to reproduce an output image corresponding to the input image, said apparatus for processing the image information signal so as to enable said image information output means to pleasantly reproduce the output image, comprising:

image-type discriminating means for discriminating the type of the input image on the basis of a distribution, within a pixel array of a specified size, of image characteristic signals derived from image information signals each representing one pixel of the input image, wherein the image characteristic signals are each a binary Laplacian signal of an image information signal corresponding to one pixel of the input image; and means responsive to said image-type discriminating means to select one of processing for binary encoding the image information signal in accordance with the type of input image, the processed image information signal being applied to said image information output means.

2. The image information signal processing apparatus according to claim 1, wherein the Laplacian signal corresponds to the difference between the image information signal corresponding to one pixel of the input image within the pixel array and an average of the image information signals corresponding to the pixels of the pixel array.

3. The image information signal processing apparatus according to claim 1, wherein the input image includes a first type of character/line-based image, a second type of halftone image, and a third type of continuous-tone image, and wherein said binary encoding processing selecting means is responsive to said image-type discriminating means to select, with respect to the first type of character/line-based image, a processing for simple binary encoding of the image information signal which is carried out on the basis of a fixed threshold value and, with respect to the other types of images, a processing for dithering the image information which is carried out on the basis of a variable threshold value.

4. The image information signal processing apparatus according to claim 3, wherein said binary encoding processing selecting means is arranged, when the type of the input image has been discriminated by said image-type discriminating means to correspond to the first type of character/line-based image, to receive an image information signal whose high frequency components are intensified and to encode this signal by the simple binary encoding processing; when the type of the input image has been discriminated by said image-type discriminating means to correspond to the second type of halftone image, to receive an averaged image information signal and to encode this signal by the dithering processing; and, when the type of the input image has been discriminated by said image-type discriminating means to correspond to the third type of continuous-tone image, to receive a non-processed image information signal and to encode this signal by the dithering processing.

5. An image information signal processing apparatus used in an image reproducing system including an image information input means for obtaining an image information signal corresponding to each pixel of an input image, which belongs to one of specified image types, by optically scanning the input image, and image information output means responsive to the image information signal to reproduce an output image corresponding to the input image, said apparatus for processing the image information signal so as to enable said image information output means to pleasantly reproduce the output image, comprising:

Laplacian calculating means connected to receive the image information signal for calculating a Laplacian thereof for each pixel of the input image to produce a Laplacian signal;

image-type discriminating means connected to receive the Laplacian signal from said Laplacian calculating means for comparing a distribution, in a specified pixel array, of binary Laplacian signals with a previously stored distribution of binary Laplacian signals for each type of the specified image types, to thereby discriminate the type of the input image;

image information signal compensating means connected to receive the image information signal for producing a first image information signal whose high frequency components are intensified and a second image information signal representing an average of image signals corresponding to a specified pixel array;

image information signal selecting means responsive to said image-type discriminating means to select, in accordance with the discriminated type of the input image, one of the first and second image information signals and a non-processed image information signal; and binary encoding selecting means responsive to said image-type discriminating means for binary encoding the selected image information signal on the basis of a fixed threshold value upon receiving the first image information signal from said image information signal selecting means, and dithering the selected image information signal upon receiving the second image information signal or the non-processed image information signal, the binary-encoded or dithered selected image information signal being applied to said image information output means.

6. The image information signal processing apparatus according to claim 5, wherein the Laplacian corresponds to the difference between an image information signal corresponding to one pixel within a pixel array and a signal representing an average of image information signals corresponding to the pixels of the pixel array.

7. The image information signal processing apparatus according to claim 5, wherein the image information signal is a brightness signal.

8. The image information signal processing apparatus according to claim 5, wherein the specified image type include a first type of character/line-based image, a second type of halftone image, and a third type of continuous-tone image; and wherein said binary encoding selecting means is responsive to said image-type discriminating means to select, with respect to the first type of character/line-based image, a simple binary encoding processing to binary encode the selected image information signal on the basis of a fixed threshold value and, with respect to the other types of images, a dithering processing to binary encode the selected image information signal on the basis of a variable threshold value.

9. The image information signal processing apparatus according to claim 5, wherein said image-type discriminating means includes first circuit means for comparing a distribution, in the specified pixel array, of binary Laplacian signals with a previously stored distribution of binary Laplacian signals for each type of the specified image types; second circuit means connected to receive the Laplacian signal to examine the magnitude of the Laplacian signal; feedback circuit means for storing results of previous decisions made by said image-type discriminating means; and decision circuit means for finally discriminating the type of input image in response to said first and second circuit means and said feedback circuit means to cause said binary encoding selecting means to select either the binary encoding processing or the dithering processing.

10. An image information signal processing apparatus used in an image reproducing system including image information input means for obtaining an image information signal corresponding to each of pixels of an input image, which belongs to one of specified image types, by optically scanning the input image; and image information output means responsive to the image information signal to reproduce an output image corresponding to the input image, said apparatus for processing the image information signal so as to enable said image information output means to pleasantly reproduce the output image, comprising:

circuit means for providing a brightness information signal and first and second color difference signals which correspond to each of pixels of an input image;

Laplacian calculating means connected to receive the brightness signal for calculating a Laplacian thereof for each pixel of the input image to produce a Laplacian signal;

image-type discriminating means connected to receive the Laplacian signal from said Laplacian calculating means for comparing a distribution, in a specified pixel array, of binary Laplacian signals with a previously stored distribution of binary Laplacian signals corresponding to each type of the specified image types, to thereby discriminate the type of input image;

brightness information signal compensating means connected to receive the brightness information signal for producing a first brightness information signal whose high frequency components are intensified and a second brightness information signal representing an average of image signals corresponding to pixels in the specified pixel array;

brightness information signal selecting means responsive to said image-type discriminating means to select, in accordance with the discriminated image type, one of the first and second brightness information signals, and a noncompensated brightness information signal;

color difference signal compensating means connected to receive the first and second color difference signals to produce first and second average color difference signals each representing an average of color difference signals corresponding to the pixels in the specified pixel array;

color conversion means connected to receive the brightness information signal from said brightness information signal selecting means and the first and second average color difference signals from said color difference signal compensating means for converting these signals into the first to third color information signals suitable for the reproduction of the output image; and binary encoding selecting means connected between said color conversion means and said output means and responsive to said image-type discriminating means for binary encoding the color information signals on the basis of a fixed threshold value when the first brightness information signal is selected by said brightness information signal selecting means, and to dither the color information signals when the second brightness information signal or the non-compensated brightness information signal is selected, the binary-encoded or dithered color information signals being applied to said image information output means.

* * * * *